United States Patent
Nakamura

[19]
[11] Patent Number: 5,987,424
[45] Date of Patent: Nov. 16, 1999

[54] ACCOUNTING METHOD AND SYSTEM FOR DISCOUNTED COMMUNICATIONS CHARGES

[75] Inventor: Toshio Nakamura, Tokyo, Japan

[73] Assignee: Nec Corporation, Tokyo, Japan

[21] Appl. No.: 08/890,827

[22] Filed: Jul. 10, 1997

[30] Foreign Application Priority Data

Jul. 12, 1996 [JP] Japan ................................. 8-202870

[51] Int. Cl.⁶ .............................. G06F 19/00; H04M 1/64
[52] U.S. Cl. ............................................ 705/14; 379/88.2
[58] Field of Search ........................ 705/14, 1; 379/88.2

[56] References Cited

U.S. PATENT DOCUMENTS

| 3,876,840 | 4/1975 | Bryant, Jr. ................................. 379/71 |
| 4,165,446 | 8/1979 | Flowers et al. ....................... 379/93.14 |
| 4,510,349 | 4/1985 | Segre-Amar .............................. 379/87 |
| 4,850,007 | 7/1989 | Marino et al. ......................... 379/88.2 |
| 4,916,731 | 4/1990 | Brisson ................................ 379/93.22 |

FOREIGN PATENT DOCUMENTS

| 3-283965 | 12/1991 | Japan . |
| 8-5-260185 | 10/1993 | Japan . |
| 8-130579 | 5/1996 | Japan . |
| 8-172495 | 7/1996 | Japan . |

*Primary Examiner*—Allen R. MacDonald
*Assistant Examiner*—Penny Caudle
*Attorney, Agent, or Firm*—Foley & Lardner

[57] ABSTRACT

An accounting method is provided wherein advertisement information is provided from an exchange to a terminal accommodated in the exchange and the communication charge to be charged to the terminal is discounted based on an amount of advertisement information received by the terminal.

Advertisement information is provided from an advertisement apparatus provided in an exchange to a subscriber terminal, and a discount money amount is determined based on an amount of advertisement information provided. Each time the subscriber telephone set receives advertisement information, a discount money amount for the subscriber telephone set is cumulatively stored into an accounting apparatus, and the amount of money to be charged to the subscriber telephone set is determined based on the discount money amount recorded in the accounting apparatus and the money amount of communication charges imposed based on ordinary communication.

22 Claims, 29 Drawing Sheets

Fig. 4

(PARTICULAR NUMBER IS DIALED FROM PUBLIC
TELEPHONE SET/SUBSCRIBER TELEPHONE SET)
(START)

| CONNECT TELEPHONE SET AND ADVERTISEMENT APPARATUS INTO COMMUNICATION STATE | 201 |

| 30 SECONDS PASS? (SEND OUT ADVERTISEMENT INFORMATION FROM ADVERTISEMENT APPARATUS) | 202 |
NO / YES

| DISCONNECT TELEPHONE SET AND ADVERTISEMENT APPARATUS | 203 |

| IMPOSE COMMUNICATION CHARGE ON ADVERTISEMENT APPARATUS | 204 |

| CONNECT TELEPHONE SET AND TIME ANNOUNCEMENT APPARATUS INTO COMMUNICATION STATE | 205 |

| 30 SECONDS PASS? (SEND OUT TIME INFORMATION FROM TIME ANNOUNCEMENT APPARATUS) | 206 |
NO / YES

| DISCONNECT TELEPHONE SET AND TIME ANNOUNCEMENT APPARATUS | 207 |

| IMPOSE COMMUNICATION CHARGE ON ADVERTISEMENT APPARATUS | 208 |

(END)

Fig. 5

(PARTICULAR NUMBER IS DIALED FROM PUBLIC
TELEPHONE SET/SUBSCRIBER TELEPHONE SET)
(START)

- 301: RECEIVE DIAL INFORMATION (DESTINATION OF COMMUNICATION) FROM TELEPHONE SET
- 302: CONNECT TELEPHONE SET AND ADVERTISEMENT APPARATUS INTO COMMUNICATION STATE
- 303: 30 SECONDS PASS? (SEND OUT ADVERTISEMENT INFORMATION FROM ADVERTISEMENT APPARATUS) — NO (loop back) / YES
- 304: DISCONNECT TELEPHONE SET AND ADVERTISEMENT APPARATUS
- 305: IMPOSE COMMUNICATION CHARGE ON ADVERTISEMENT APPARATUS
- 306: RECEIVE DIAL INFORMATION (DESTINATION OF COMMUNICATION) FROM TELEPHONE SET
- 307: CONNECT TELEPHONE SET AND DESTINATION OF COMMUNICATION INTO COMMUNICATION STATE
- 308: 30 SECONDS PASS? — NO (loop back) / YES
- 309: DISCONNECT TELEPHONE SET AND DESTINATION OF COMMUNICATION
- 310: IMPOSE COMMUNICATION CHARGE ON ADVERTISEMENT APPARATUS (END)

Fig. 14

DISPLAY UNIT

| KIND NUMBER | FIELD | TARGET AGE | TARGET SEX | ADVER-TISEMENT PERIOD | DISCOUNT MONEY AMOUNT | PROVIDED MEDIA |
|---|---|---|---|---|---|---|
| 0001 | CAR | OLDER THAN 20 | MALE | 30 SECONDS | 10 YEN | VOICE |
| 0002 | TRAVEL | OLDER THAN 20 | FEMALE | 30 SECONDS | 30 YEN | MOVING PICTURES |
| ... | ... | ... | ... | ... | ... | ... |
| n | MARRIAGE | OLDER THAN 20 | MALE & FEMALE | 60 SECONDS | 50 YEN | MOVING PICTURES |

Fig. 15

ACCOUTING MEMORY 1

| SUBSCRIBER TELEPHONE SET 1 | | | SUBSCRIBER TELEPHONE SET n | | |
|---|---|---|---|---|---|
| ADVER-TISEMENT KIND | RECEIVE TIME | DISCOUNT MONEY AMOUNT | ADVER-TISEMENT KIND | RECEIVE TIME | DISCOUNT MONEY AMOUNT |
| 0002 | 3.1 2:30 | 30 | | | |
| | | | | | |
| | | | | | |
| | | | | | |
| | | | | | |

Fig. 16

ACCOUNTING MEMORY 2

ADVERTISER 1 (PROVIDER OF ADVERTISEMENT KIND 0002)

| SUBSCRIBER TELEPHONE SET NUMBER | TRANS-MISSION TIME | DISCOUNT MONEY AMOUNT | COMMUNICA-TION CHARGE |
|---|---|---|---|
| 03-XXXXXX | 3.13:30 | 30 | 10 |
| | | | |
| | | | |
| | | | |

ADVERTISER n (PROVIDER OF ADVERTISEMENT KIND XXXX)

| SUBSCRIBER TELEPHONE SET NUMBER | TRANS-MISSION TIME | DISCOUNT MONEY AMOUNT | COMMUNICA-TION CHARGE |
|---|---|---|---|
| | | | |
| | | | |
| | | | |
| | | | |

Fig. 26

DISPLAY UNIT

```
xxx(MONTH), xxx(YEAR)

BASIC RATE          1,000 YEN

COMMUNICATION
CHARGE              1,500 YEN

DISCOUT CHARGE      2,600 YEN
_____

AMOUNT CLAIMED      -100 YEN
```

ACCOUNTING METHOD AND SYSTEM FOR DISCOUNTED COMMUNICATIONS CHARGES

BACKGROUND OF THE INVENTION

1. Field of the Invention

This invention relates to an accounting method for accounting communication charges of communication terminals for ordinary homes and public telephone sets accommodated in a communication network, and more particularly to an accounting system wherein communication charges are discounted or reduced to zero by transmitting commercial information (advertisement information for commercial advertisement) to communication terminals for ordinary homes and public telephone sets.

2. Description of the Related Art

Conventionally, a communication charge for a telephone is usually imposed on a person originating a communication. However, another system wherein, when communication is performed with a particular party, the terminating party is charged for the communication is also available.

Also, a partition accounting system is available wherein, in a communication network wherein a video signal is distributed from a video distribution center to terminals such as a cable television (CATV), an entire single communication is partitioned into a portion of announcement images (commercial images) and another portion of regular images and the communication charge for the announcement image portion is charged to the video distribution center while the communication charge for the regular image portion is charged to the terminals.

Also, another system is available wherein, when the Internet is accessed using particular software sold by an Internet undertaker, purchased by a user and installed in a personal computer, commercial information is displayed at a portion of a screen of a display unit of the personal computer, and thereupon, the user is required only to pay the communication charge for communication to an Internet access point while the Internet access charge is not imposed on the user.

However, as development of such multi-media communications as television telephone proceeds, a demand of consumers for a lower communication rate and a demand of undertakers for more effective delivery of commercial information to a communication network are increasing.

As prior art which meets the requirements, for example, Japanese Patent Laid-Open No. 283965/1991 (title of the invention="Public Telephone Set") has been proposed. A system disclosed in the document just mentioned is described.

In the prior art described above, as shown in FIG. 1, special public telephone set 51 is provided in which card reader unit 52 for reading a particular prepaid card and CM sending out unit 53 for sending out a commercial signal to an originating party are built in.

If an off-hook state of public telephone set 51 is detected, then a commercial signal is sent out for a fixed period of time from CM sending out unit 53 to a transmitter-receiver via telephone circuit 54 under the control of CPU 56. Then, after the signal is sent out, a dialed number is accepted and transmitted from main wire circuit 55 to a public network to allow communication, and the communication charge is discounted totally or partially and paid from a particular prepaid card.

As criteria of the communication charge, four criteria of "free", "charged", "free for a fixed time" and "charged with a charging period and a communication charge determined from a dial number" are provided in addition to distinction between a local call and a station-to-station call.

Further, a call is terminated from center equipment 57 to public telephone set 51 via the public network, and a switching request signal for commercial (hereinafter denoted by CM) contents is communicated so that different CM contents (a plurality of commercial signals are stored in CM transmission unit 53) may be sent out.

The system disclosed in Japanese Patent Laid-Open Application No. 283965/1991 mentioned above, however, has several problems described below.

The first problem resides in that it is required to set up special public telephone sets and, in order that many and unspecific persons who live in a wide area can daily use the specific public telephone sets, massive capital investment is required.

The second problem resides in that the system can be used by only those persons who have a particular prepaid card. Even if the system is augmented so that it can be used using a coin, a bill or a credit card, the system cannot still be utilized without them. Accordingly, a person who has none of them cannot utilize the system. Further, since a prepaid card is liable to be counterfeited, considerable expense is required for a countermeasure against counterfeit.

The third problem resides in that, since, when a specific public telephone set is used, the user must listen to a CM message without fail, the system is inconvenient and disadvantageous to a person who wants to talk quickly without listening to the advertisement information even if the communication charge is not discounted. In order to solve this problem simply, two telephone sets including a special public telephone set and an ordinary public telephone set must be provided together.

Further, the fourth problem resides in that, since a call is terminated from a center equipment to a public telephone set and a switching request signal for CM contents is communicated so that different advertisement information contents (a plurality of commercial messages are stored in the CM sending out unit) may be switchably sent out, much time is required before switching of the CM message takes place. Consequently, if the same person tries to telephone successively from the same public telephone set or several times in a day, then the person listens to the CM of the same contents every time. Accordingly, the CM efficiency is low.

In order to solve this problem to some degree, the period in which a switching request signal is sent out from the center equipment should be reduced. However, if the undertaker who provides the public network and the service undertaker which manages the center equipment/special public telephone sets are different from each other, then a massive communication charge must be charged to the service undertaker in order to send out the switching request signal.

The fifth problem resides in that massive maintenance expenditures are required in order to exchange CM contents built in each public telephone set. Although Japanese Patent Laid-Open Application No. 283965/1991 discloses nothing of a method of exchanging CM contents, in a general idea, an exchanging operation of a recording medium in which the CM contents are stored is performed in a suitable period (for example, in a period of one month or a half year) by an operator who performs maintenance. However, although there is no problem where the service area is small, if it is tried to expand the service area, then the exchanging operation must be performed for a large number of public telephone sets, and also for maintenance of them, massive expenditures are required.

In order to solve this problem, a possible countermeasure would seem to be to call a public telephone set from the center equipment and re-write the recording medium, in which CM contents are stored, by remote control. However, even if this method is employed, where the number of public telephone sets involved is very large, a considerable communication charge cannot be avoided (communication charge for remote control).

The sixth problem resides in that a person who uses a public telephone set cannot select CM contents. This results in cases where CM information about a place for marriage ceremonies is provided to a user who is 10 years old or CM information of a sports car is provided to a user whose age is, in an extreme case, 90 to 100. Consequently, the effectiveness of the CM is reduced.

The seventh problem is such as follows. Different from information such as CM information in a television broadcast which a viewer is obliged to observe, many persons desire reception of CM information as an effective information source. To a user of the type just mentioned, the time when the user wants to receive CM information and the time when the user wants to talk do not coincide with each other. For example, a user who listens to CM information on January 1 may want to telephone on January 20 enjoying a discount in charge.

However, since the discount is invalid unless the user talks after listening to CM information from the public telephone set, the discount of the communication charge cannot be provided to the user of the type described above.

The eighth problem resides in that a user cannot select whether the communication charge should be discounted totally or partially. In particular, if it is assumed that the discount quantity is 50 yen, even if a user wants to select the total discount after talking for a time for 50 yen even though the talking is interrupted or another user wants to continue talking after talking for a time for 50 yen even though the continued talking requires a charge, the system disclosed in Japanese Patent Laid-Open Application No. 283965/1991 allows a service only for the latter.

Further, the ninth problem resides in that the discount quantity (amount of CM information) for the communication charge cannot be selected by a user. In particular, a discount quantity of 50 yen by reception of CM information for 30 seconds may be sufficient to a user who wants short haul/short time talking. However, another user who wants long haul/long time talking may desire a discount of 150 yen by reception of CM information for 90 seconds.

Or, while a person who is in a hurry may want to receive CM information for a short time and talk enjoying some discount, another person who has sufficient time may want to receive CM information for a long time to enjoy a discount by a large amount of money.

However, the system disclosed in Japanese Patent Laid-Open Application No. 283965/1991 merely provides different services for local calls and station-to-station calls. Besides, the apparatus effects such discrimination fixedly, and there is no room for selection by a user.

Furthermore, the tenth problem resides in that, if a call cannot be connected because the other party of the communication is busy or absent after a user listens to CM information, the user has listened to the CM information in vain.

Further, the eleventh problem resides in that, although Japanese Patent Laid-Open Application No. 283965/1991 mentioned above does not disclose a relationship of an amount of money paid from an advertiser to an undertaker and a discount quantity to proceeds of prepaid cards, from the description of an embodiment in the document, it is impossible to discriminate how many times each one of a plurality of commercial messages has been sent out.

Accordingly, it likely occurs that an advertiser pays a fixed amount of money to an undertaker while a CM message has not been sent out at all.

For example, if it is assumed that 10 advertisers (10 CM messages) are involved and a CM contents switching request signal is communicated in a cycle of once a day, then CM contents to be sent out are switched every day. However, a CM message of an advertiser to whom only days are allotted on which the telephone set is used by none or by a comparatively small number of users is sent out less frequently.

In other words, the system is not constructed so that an advertiser pays to an undertaker an amount of money which increases in proportion to the number of times by which a CM message is sent out (for example, the amount of money for one month payable from the advertiser to the undertaker is determined as "fixed amount=50,000 yen"+"merit amount=number of CM sending out times×100 yen", and the upper limit to the merit amount is set to 500,000 yen).

Or, the system is not so constructed that a CM message can be sent out by a number of times which corresponds to an amount of money imposed on an advertiser (for example, where the amount of money for sending out of a CM message once is determined to be 100 yen, if an advertiser wants sending out for 1,000 yen in the maximum, that is, by 10 times, then the CM message is sent out only by 10 times, and thereafter, sending out of the CM message is stopped).

Further, the twelfth problem resides in that it is difficult for an undertaker who provides only a communication network to discount a communication charge based on a commercial message. In other words, the system of Japanese Patent Laid-Open Application No. 283965/1991 discloses a technique which can be realized only by an undertaker who sets up a public telephone set.

Furthermore, the thirteenth problem resides in that it is difficult for a subscriber telephone set set up in an ordinary home to enjoy a discount of a communication charge by a CM message.

Indeed it may be technically realizable for a subscriber telephone set set up in an ordinary home to enjoy a discount of a communication charge by a CM message if the same structure as that of the special public telephone set is built into the subscriber telephone set or added as an adapter to the subscriber telephone set, the cost required to set up the special subscriber telephone set/adapter must be charged to the undertaker or the ordinary home. However, when the number of subscriber telephone sets present in ordinary homes is considered, it can be estimated readily that massive expenditures are required.

Further, it is very inconvenient that a special prepaid card is used in an ordinary home.

Besides, the maintenance expenditures required to re-write the storage media in which CM contents are stored are very massive where the number of subscriber telephone sets present in ordinary homes is taken into consideration.

In addition, it is impossible to provide a CM message in the form of facsimile data to a facsimile communication (FAX) terminal to discount the communication charge.

Further, the fourteenth problem resides in that the system disclosed in Japanese Patent Laid-Open Application No.

283965/1991 is of the type wherein a CM message is provided when a user performs a predetermined operation, and therefore, an undertaker cannot sometimes provide a CM message actively to a user. In other words, it is impossible for an undertaker to call a user and provide a CM message to the user and then discount the communication charge.

SUMMARY OF THE INVENTION

Accordingly, the present invention has been made in view of the circumstances described above, and it is an object of the present invention to provide an accounting method which eliminates the problems described above. For example, the present invention provides a method which allows time information or the like, which is usually provided with charge, to be acquired free of charge by an ordinary public telephone set or a subscriber telephone set for an ordinary home without setting up of a special public telephone set or a special subscriber telephone set.

In order to attain the object described above, according to the present invention, there is provided an accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on the terminal is discounted, characterized in that an exchange recognizes that a predetermined operation (dialing of a particular number or depression of a particular button attached to the terminal) determined in advance has been performed by the terminal, connects an advertisement apparatus provided for the exchange and the terminal with each other and provides advertisement information (advertisement information in the form of voice, characters, a still picture, moving pictures or facsimile data) from the advertisement apparatus to the terminal, whereby control of imposing a fixed money amount from within the communication charge to be charged to the terminal on an advertiser of the advertisement information is performed by the exchange.

With the accounting method of the present invention, a communication charge to be imposed on an ordinary public telephone set or subscriber telephone set which is a terminal accommodated in an exchange of a public network or a terminal accommodated in an exchange of a private communication network can be reduced. Further, advertisement information can be provided effectively to those terminals.

BRIEF DESCRIPTION OF THE DRAWINGS

FIG. 4 is a flow chart illustrating operation of a second embodiment of the present invention;

FIG. 5 is a flow chart illustrating operation of a third embodiment of the present invention;

FIG. 14 is a view showing an example of a screen display of a terminal in the embodiments of the present invention;

FIG. 15 is a view showing a memory construction in the embodiment of the present invention;

FIG. 16 is a view showing another memory construction in the embodiment of the present invention;

FIG. 26 is a view showing a screen display of a terminal in the embodiments of the present invention;

DETAILED DESCRIPTION OF THE PREFERRED EMBODIMENTS

Embodiments of the present invention are described below with reference to the drawings.

Embodiment 1

Figure 1:
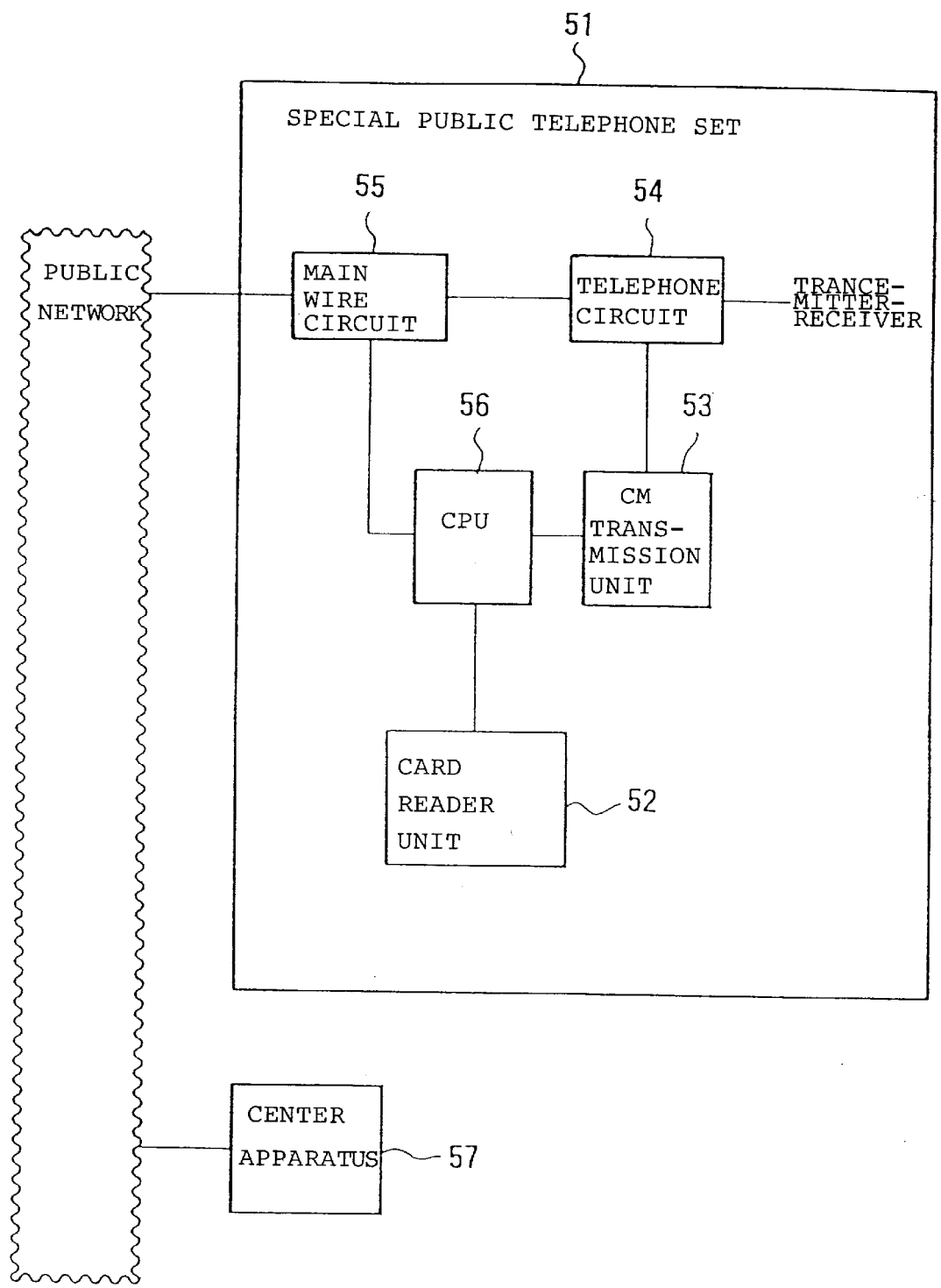
FIG. 1 is a block diagram showing the prior art.
Figure 2:
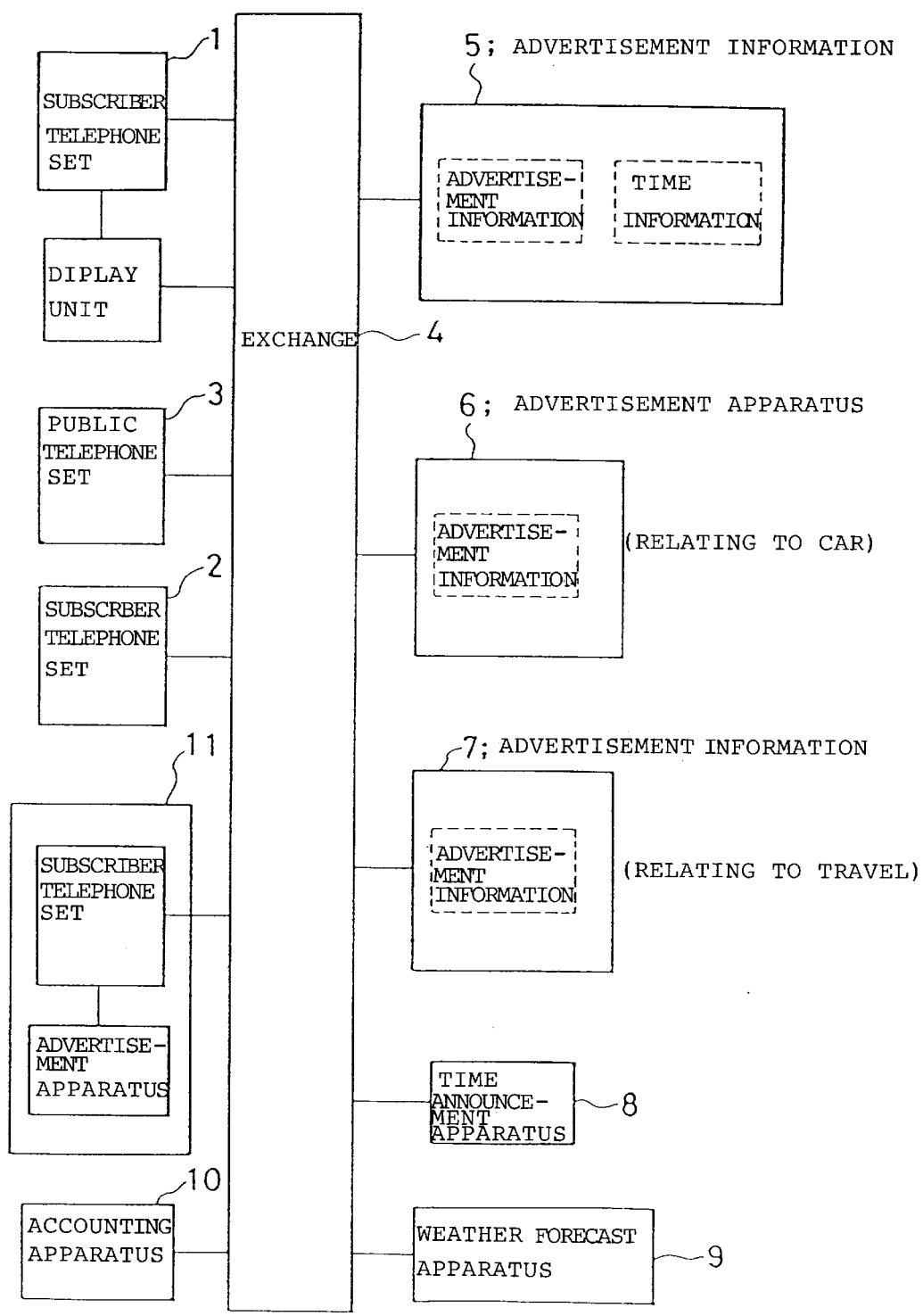
FIG. 2 is a block diagram showing a construction of an embodiment of the present invention.

FIG. 2 is a block diagram showing a construction of a first embodiment of the present invention and illustrating a construction and connection of associated apparatus.

Referring to FIG. 2, in the embodiment shown, subscriber telephone sets 1 and 2 set up in ordinary homes and public telephone set 3 set up at a public location such as on a road are connected to and accommodated in exchange 4 which controls connection of a public network. Further, advertisement apparatus 5 and 6 for sending out advertisement information by voice to a telephone, time announcement apparatus 8 for sending out time information by voice to a telephone, weather forecast apparatus 9 for sending out weather information to a telephone and accounting apparatus 10 for recording a communication history in order to demand for payment of monthly communication charges to the subscriber telephones are provided for exchange 4. While advertisement apparatus 6 and 7 send out only advertisement information, advertisement apparatus 5 can successively send out advertisement and time information.

Subscriber telephone sets 1 and 2, public telephone set 3, advertisement apparatus 5 and 6, time announcement apparatus 8 and weather forecast apparatus 9 can be connected to each other by exchange 4.

Figure 3:
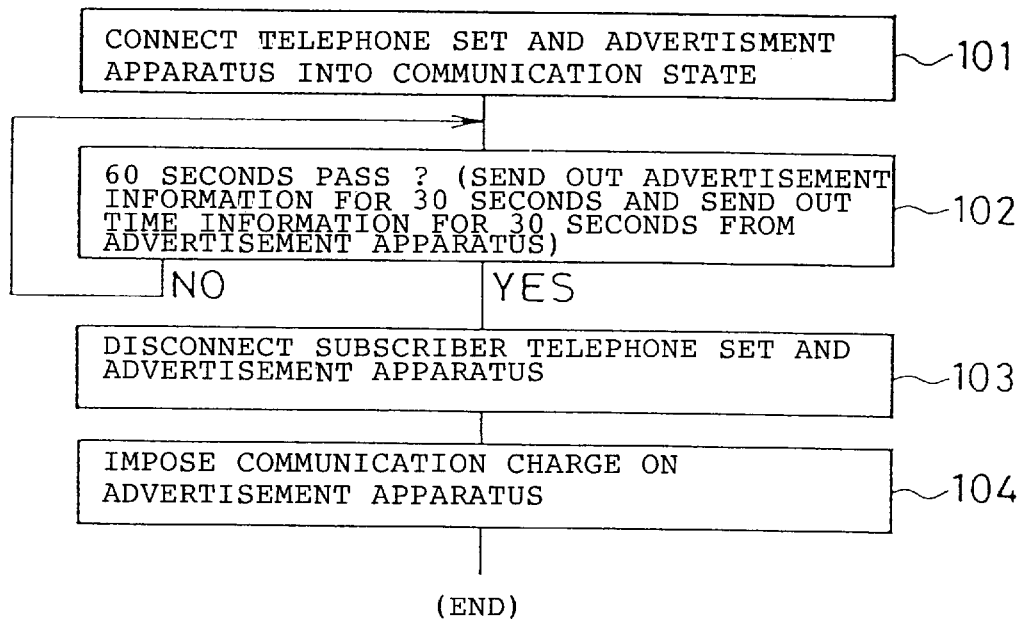
FIG. 3 is a flow chart illustrating operation of the embodiment of the present invention.

Next, operation of the first embodiment of the present invention is described. An ordinary exchange effects various controls based on a program incorporated therein, and FIG. 3 is a flow chart illustrating the controls.

A main operation procedure of the first embodiment is described with reference to FIGS. 2 and 3.

First, subscriber telephone set 1 in FIG. 2 is put into an off-hook state from a free state, and then a predetermined particular number determined in order to acquire advertisement information and time information is dialed. The particular number is determined and advertised in advance by a communication undertaker, and a user of subscriber telephone set 1 performs a dialing operation in order to receive advertisement information and time information.

Exchange 4 having received this particular number connects subscriber telephone set 1 and advertisement apparatus 5 to each other to establish a communication state (step 101). Then, advertisement information for 30 seconds and time information for 30 seconds are automatically sent out from advertisement apparatus 5 to subscriber telephone set 1. Exchange 4 supervises whether or not 60 seconds pass after the connection is established (step 102).

Then, when subscriber telephone set 1 completes the reception of the advertisement information and time information, that is, when 60 seconds pass, exchange 4 disconnects subscriber telephone set 1 and advertisement apparatus 5, which have been connected till then, from each other (step 103).

Thereafter, exchange 4 edits accounting information so that a communication charge for 60 seconds for which communication between subscriber telephone set 1 and advertisement apparatus 5 has been performed is imposed on the advertiser of the advertisement information transmitted from advertisement apparatus 5, and sends out the accounting information to accounting apparatus 10 (step 104).

It is to be noted that, while, in the first embodiment, an operation from a subscriber telephone set is described, naturally the first embodiment operates similarly in response to an operation from a public telephone set.

Further, if not only time information but also a plurality of particular numbers and corresponding advertisement apparatus are provided, then a weather forecast, news or the like can be selectively enjoyed by a user. Furthermore, advertisement information and a plurality of kinds of provided information (time information, weather information, news and so forth) are stored in a single advertisement apparatus so that a kind of provided information may be designated from an exchange based on a particular number.

As described above, in the first embodiment of the present invention, even if a special public telephone set or a special subscriber telephone set is not set up, time information which is usually provided charged for by an ordinary public telephone set or a subscriber telephone set for an ordinary home can be acquired free of charge from a subscriber telephone set. Further, different from a special terminal which must receive advertisement information without fail, if an ordinary dialing operation is performed without performing a particular operation, then talking can be performed without receiving advertisement information. In other words, a user can select whether or not advertisement information should be received.

Furthermore, since an advertisement apparatus is installed in an exchange, the cost for maintenance for exchanging contents of advertisement information can be reduced comparing with that which is required where an advertisement apparatus is built in a terminal.

Embodiment 2

Next, a second embodiment of the present invention is described in detail with reference to FIG. 2 and FIG. 4 which is a flow chart illustrating control of the exchange.

First, subscriber telephone set 1 in FIG. 2 is put into an off-hook state from a free state, and then a predetermined particular number determined in order to acquire advertisement information and time information is dialed. The particular number is determined and advertised in advance by a communication undertaker, and a user of subscriber telephone set 1 performs a dialing operation in order to receive advertisement information and time information.

Exchange 4 having received this particular number connects subscriber telephone set 1 and advertisement apparatus 6 to each other to establish a communication state (step 201).

Then, advertisement information for 30 seconds is automatically sent out from advertisement apparatus 6 to subscriber telephone set 1. Exchange 4 supervises whether or not 30 seconds pass after the connection is established (step 202).

Then, when subscriber telephone set 1 completes the reception of the advertisement information, that is, when 30 seconds pass, exchange 4 disconnects subscriber telephone set 1 and advertisement apparatus 6, which have been connected till then, from each other (step 203).

Thereafter, exchange 4 edits accounting information so that a communication charge for 30 seconds for which communication between subscriber telephone set 1 and advertisement apparatus 6 has been performed is imposed on the advertiser of the advertisement information transmitted from advertisement apparatus 6, and sends out the accounting information to accounting apparatus 10 (step 204).

Then, exchange 4 puts subscriber telephone set 1 and time announcement apparatus 8 into a communication state with each other so that time announcement information for 30 seconds is automatically sent out from time announcement apparatus 8 to subscriber telephone set 1 (step 205).

Exchange 4 supervises whether or not 30 seconds pass after the connection is established (step 206).

Then, when subscriber telephone set 1 completes reception of the time announcement information, that is, when 30 seconds pass, exchange 4 disconnects subscriber telephone set 1 and time announcement apparatus 8, which have been connected till then, from each other (step 207).

Thereafter, exchange 4 edits accounting information so that a communication charge for 30 seconds for which communication between subscriber telephone set 1 and time announcement apparatus 8 has been performed is imposed on the advertiser of the advertisement information transmitted from advertisement apparatus 6, and sends out the accounting information to accounting apparatus 10 (step 208).

It is to be noted that, while, in the present second embodiment, an operation from a subscriber telephone set is described, naturally the present embodiment operates similarly in response to an operation from a public telephone set. Further, if not only time information but also a plurality of particular numbers are provided in a corresponding relationship to the time announcement apparatus, weather forecast apparatus and so forth, then suitable information can be selectively acquired by a user.

As described above, with the second embodiment of the present invention, since a time announcement apparatus, a weather forecast apparatus or a like apparatus set up generally is combined with an advertisement apparatus, the advertisement apparatus is simplified in structure.

Further, since an advertisement apparatus does not include time announcement information, weather information or the like, also information management of the advertisement apparatus is easy. Furthermore, where only one single advertisement apparatus is involved, such combination as advertisement information+time announcement information, advertisement information+weather information and so forth is possible.

Embodiment 3

Next, a third embodiment of the present invention is described in detail with reference to FIG. 2 and FIG. 5 which is a flow chart illustrating control of the exchange.

First, subscriber telephone set 1 in FIG. 2 is put into an off-hook state from a free state, and then a predetermined particular number determined in order to acquire advertisement information is dialed. The particular number is determined and advertised in advance by a communication undertaker, and a user of subscriber telephone set 1 performs a dialing operation in order to receive advertisement information.

Then, subscriber telephone set 1 dials a telephone number of subscriber telephone set 2 which is to be selected as a destination of communication, and exchange 4 receives the telephone number (step 301).

Exchange 4 connects subscriber telephone set 1 and advertisement apparatus 6 to each other to establish a communication state (step 302).

Then, advertisement information for 30 seconds is automatically sent out from advertisement apparatus 6 to subscriber telephone set 1. Exchange 4 supervises whether or not 30 seconds pass after the connection is established (step 303).

When subscriber telephone set 1 completes the reception of the advertisement information, that is, when 30 seconds pass, exchange 4 disconnects subscriber telephone set 1 and advertisement apparatus 6, which have been connected till then, from each other (step 304).

Thereafter, exchange 4 edits accounting information so that a communication charge for 30 seconds for which communication between subscriber telephone set 1 and advertisement apparatus 6 has been performed is imposed on the advertiser of the advertisement information transmitted from advertisement apparatus 6, and sends out the accounting information to accounting apparatus 10 (step 305).

Then, subscriber telephone set 1 dials a telephone number of subscriber telephone set 2 which is to be selected as a destination of communication, and exchange 4 receives the telephone number (step 306).

This step 306, however, is provided for a case wherein it is desired to determine a destination of communication after advertisement information is acquired, and if the telephone number has been received already in preceding step 301, then it need not be received again. In other words, when subscriber telephone set 1 does not dial in step 301, the processing advances to step 302 after a fixed interval of time passes, and then the telephone number may be received in step 306 (step 306).

Then, exchange 4 puts subscriber telephone sets 1 and 2 into a communication state based on the received telephone number of the destination of communication (step 307).

Thereafter, exchange 4 supervises whether or not 30 seconds pass after the connection is established (step 308).

Then, when subscriber telephone set 1 and subscriber telephone set 2 perform communication for 30 seconds, that is, when 30 seconds pass, exchange 4 disconnects subscriber telephone set 1 and subscriber telephone set 2 from each other (step 309).

Thereafter, exchange 4 edits accounting information so that a communication charge for 30 seconds for which communication between subscriber telephone set 1 and subscriber telephone set 2 has been performed is imposed on the advertiser of the advertisement information transmitted from advertisement apparatus 6, and sends out the accounting information to accounting apparatus 10 (step 310).

It is to be noted that, while it is described that, in the third embodiment of the present invention, a subscriber telephone set communicates with another subscriber telephone set, a subscriber telephone set may be called from a public telephone set, or a time announcement apparatus or the like may be called from a subscriber telephone set or a public telephone set.

As described above, with the present third embodiment, any destination of communication can be called from a subscriber telephone set or a public telephone set.

Embodiment 4

Figure 6:
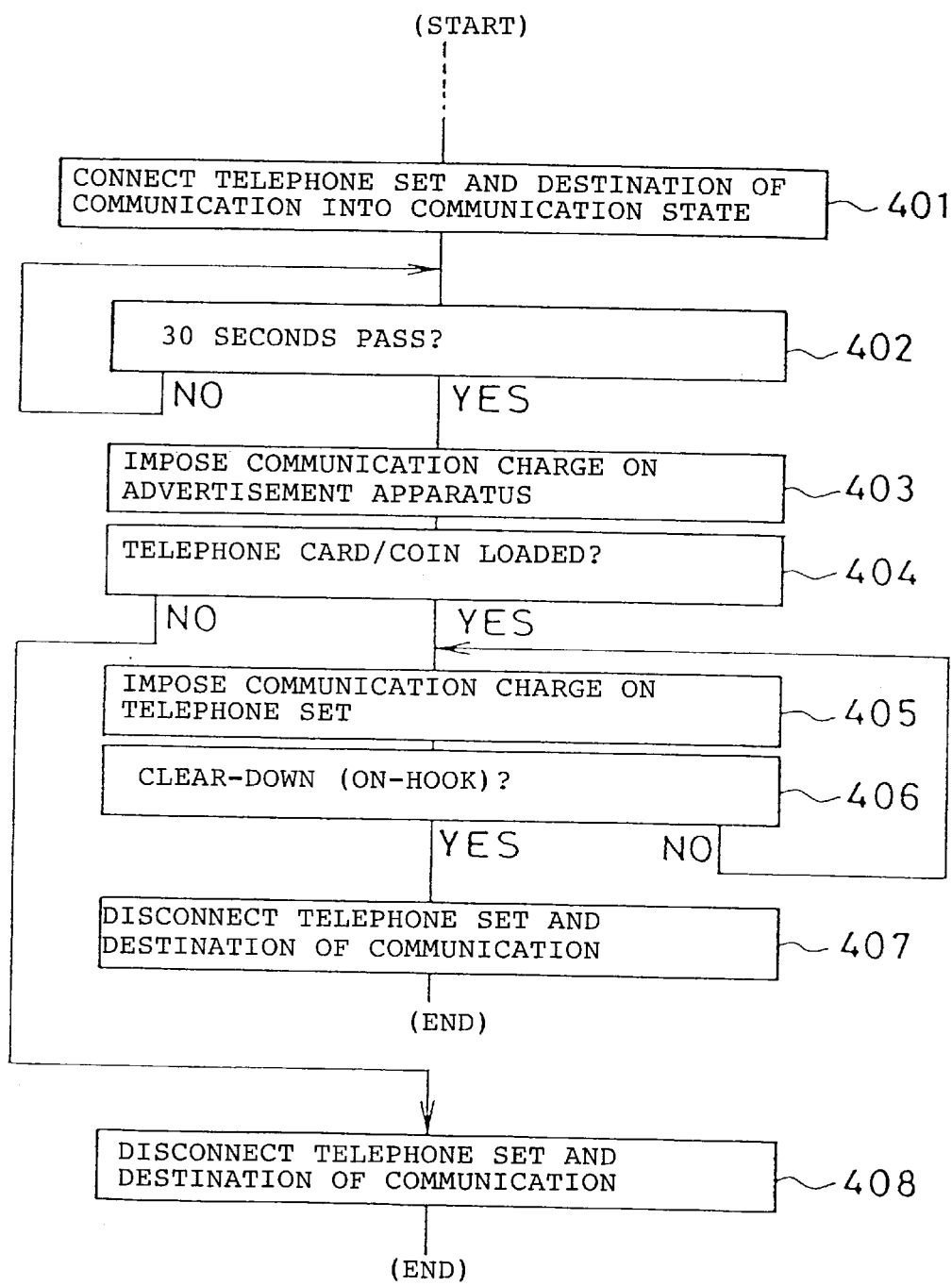
FIG. 6 is a flow chart illustrating operation of a fourth embodiment of the present invention.

Next, a fourth embodiment of the present invention is described in detail with reference to FIG. 2 and FIG. 6 which is a flow chart illustrating control of the exchange.

First, it is assumed that public telephone set 3 in FIG. 2 has a structure such that, even if it is put into an off-hook state without inserting a telephone card or a coin into it, an operation for connection to an advertisement apparatus can be performed, and operation after connection of the public telephone set to a destination of communication is described. Operation after connection of the public telephone set to an advertisement apparatus till connection to the destination of communication is equivalent to that in the third embodiment described above.

First, exchange 4 connects public telephone set 3 and subscriber telephone set 2 to each other based on the telephone number of the destination of communication received prior to establish a communication state (step 401).

Then, exchange 4 supervises whether or not 30 seconds pass after the connection is established (step 402).

Then, when public telephone set 3 and subscriber telephone set 2 perform communication for 30 seconds, that is, when 30 seconds pass, exchange 4 edits accounting information so that a communication charge for 30 seconds for which communication between public telephone set 1 and subscriber telephone set 2 has been performed is imposed on the advertiser of the advertisement information transmitted from advertisement apparatus 6, and sends out the accounting information to accounting apparatus 10 (step 403).

Thereafter, exchange 4 discriminates whether or not a telephone card or coins are loaded in public telephone set 3 (step 404).

If a telephone card or coins are not loaded in public telephone set 3, then exchange 4 disconnects public telephone set 3 and subscriber information 2 from each other and ends its processing (step 408).

However, if it is discriminated in step 404 that a telephone card or coins are loaded in public telephone set 3, then exchange 4 continues the communication between public telephone set 3 and subscriber telephone set 2 and imposes a rate on public telephone set 3 for each fixed interval of time. In other words, exchange 4 deducts the communication charge from the telephone card or the coins (step 405).

Then, if either public telephone set 3 or subscriber telephone set 2 is put into an on-hook state (or similarly when the remaining quantity of the telephone card or coins becomes reduced to zero), then exchange 4 determines that this is the end of communication (step 406) and disconnects public telephone set 3 and subscriber telephone set 2 from each other, thereby ending the processing (step 407).

It is to be noted that, while the public telephone set described above which has such a structure that, even if it is put into an off-hook state without inserting a telephone card or a coin into it, an operation for connection to an advertisement apparatus can be performed, signifies a public telephone set from which a dial tone can be heard only if it is put into an off-state, the public telephone set may be constructed otherwise such that, for example, it additionally includes a special button and an operation for connection to an advertisement apparatus can be performed only when the special button is depressed.

As described above, with the present fourth embodiment, the system can be utilized from a public telephone set even if the user does not have a particular prepaid card, a coin or a telephone card.

Embodiment 5

Figure 7:
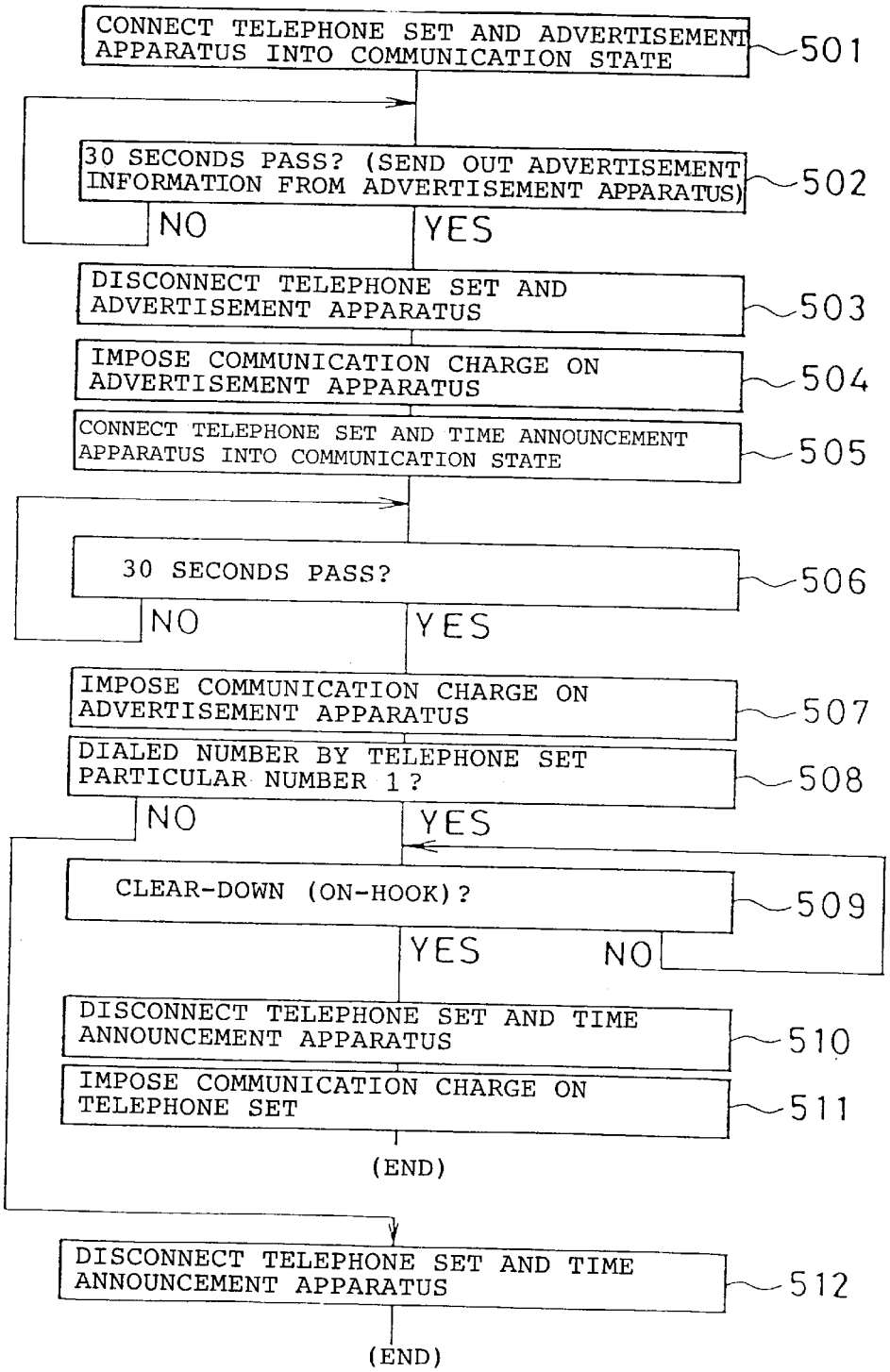
FIG. 7 is a flow chart illustrating operation of a fifth embodiment of the present invention.

Next, a fifth embodiment of the present invention is described in detail with reference to FIG. 2 and FIG. 7 which is a flow chart illustrating control of the exchange.

First, subscriber telephone set 1 in FIG. 2 is put into an off-hook state from a free state, and then particular number 1 or particular number 2 determined in order to acquire advertisement information and time information is dialed. The particular numbers are determined and advertised in advance by a communication undertaker, and a user of subscriber telephone set 1 performs a dialing operation in order to receive advertisement information and time information.

Exchange 4 having received this particular number connects subscriber telephone set 1 and advertisement apparatus 6 to each other to establish a communication state (step 501).

Then, advertisement information for 30 seconds is automatically sent out from advertisement apparatus 6 to subscriber telephone set 1. Exchange 4 supervises whether or not 30 seconds pass after the connection is established (step 502).

Then, when subscriber telephone set 1 completes the acquisition of the advertisement information, that is, when 30 seconds pass, exchange 4 disconnects subscriber telephone set 1 and advertisement apparatus 6, which have been connected till then, from each other (step 503).

Thereafter, exchange 4 edits accounting information so that a communication charge for 30 seconds for which communication between subscriber telephone set 1 and advertisement apparatus 6 has been performed is imposed on the advertiser of the advertisement information transmitted from advertisement apparatus 6, and sends out the accounting information to accounting apparatus 10 (step 504).

Then, exchange 4 puts subscriber telephone set 1 and time announcement apparatus 8 into a communication state with each other so that time announcement information for 30 seconds is automatically sent out from time announcement apparatus 8 to subscriber telephone set 1 (step 505).

Exchange 4 supervises whether or not 30 seconds pass after the connection is established (step 506).

Then, when subscriber telephone set 1 completes the acquisition of the time announcement information, that is, when 30 seconds pass, exchange 4 edits accounting information so that a communication charge for 30 seconds for which communication between subscriber telephone set 1 and time announcement apparatus 8 has been performed is imposed on the advertiser of the advertisement information transmitted from advertisement apparatus 6, and sends out the accounting information to accounting apparatus 10 (step 507).

Then, exchange 4 discriminates which one of particular number 1 and particular number 2 the number dialed first is (step 508).

Here, if the number dialed first is particular number 1, exchange 4 maintains the connection between subscriber telephone set 1 and time announcement apparatus 8 and waits until subscriber telephone set 1 performs a clearing operation (on-hook) (step 509).

Then, after an on-hook operation is performed, exchange 4 disconnects the connection between subscriber telephone set 1 and time announcement apparatus 8, which have been in the connected state, from each other (step 510).

Thereafter, exchange 4 edits accounting information so that a communication charge for the period of time for which communication between subscriber telephone set 1 and time announcement apparatus 8 has been performed after the point of time at which the accounting processing was performed in step 507 is imposed on subscriber telephone set 1, and sends out the accounting information to accounting apparatus 10 (step 511).

If it is discriminated in step 508 that the number dialed first is particular number 2, then exchange 4 immediately disconnects the connection between subscriber telephone set 1 and time announcement apparatus 8, which have been in the connected state, from each other (step 512).

It is to be noted that, while, in the present fifth embodiment, communication between a subscriber telephone set and a time announcement apparatus is described, the system can operate similarly also in communication between a subscriber telephone set and another subscriber telephone set.

As apparent from the foregoing description, according to the present invention, whether a communication charge should be discounted totally or partially can be selected by a dialing operation of a user.

Embodiment 6

Figure 8:
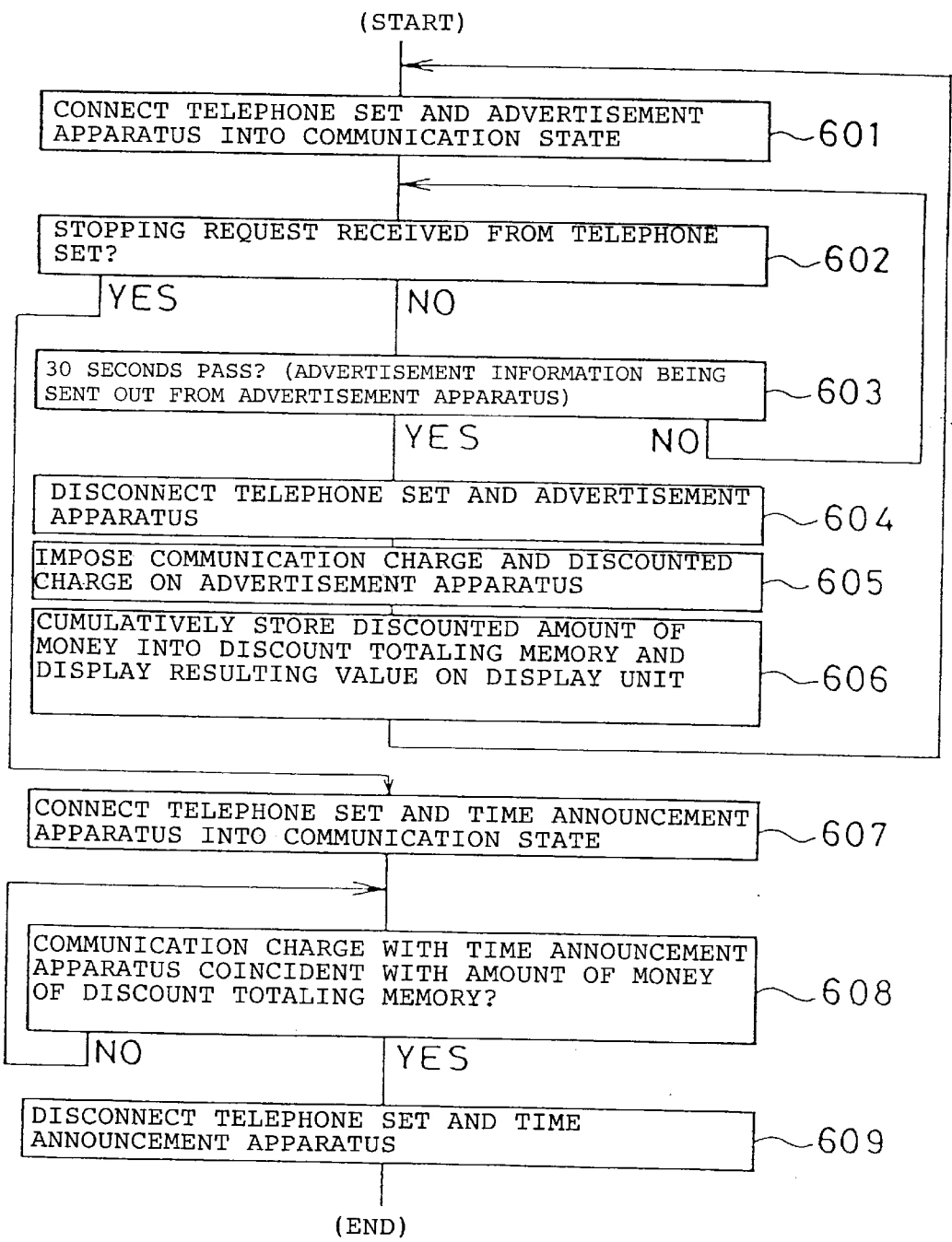
FIG. 8 is a flow chart illustrating operation of a sixth embodiment of the present invention.

Next, a sixth embodiment of the present invention is described in detail with reference to FIG. 2 and FIG. 8 which is a flow chart illustrating control of the exchange.

First, subscriber telephone set 1 in FIG. 2 is put into an off-hook state from a free state, and then a particular number determined in order to acquire advertisement information and time information is dialed. The particular number is determined and advertised in advance by a communication undertaker, and a user of subscriber telephone set 1 performs a dialing operation in order to receive advertisement information and time information.

Exchange 4 having received this particular number connects subscriber telephone set 1 and advertisement apparatus 6 to each other to establish a communication state. Then, advertisement information for 30 seconds is automatically sent out from advertisement apparatus 6 to subscriber telephone set 1 (step 601).

Exchange 4 supervises whether or not another particular number for delivering a stopping request for advertisement information is dialed by subscriber telephone set 1 (step 602) while it supervises whether or not 30 seconds pass after the connection is established (step 603).

Then, when subscriber telephone set 1 completes the acquisition of the advertisement information and time information without delivering a stopping request, that is, when 30 seconds pass, exchange 4 disconnects subscriber telephone set 1 and advertisement apparatus 6, which have been connected till then, from each other (step 604).

Exchange 4 edits accounting information so that a communication charge for 30 seconds for which communication between subscriber telephone set 1 and advertisement apparatus 6 has been performed and a discounted charge based on a result of the communication are imposed on the advertiser of the advertisement information transmitted from advertisement apparatus 6, and sends out the accounting information to accounting apparatus 10 (step 605).

Then, exchange 4 cumulatively stores the discounted amount of money, which is an amount of money imposed on the advertiser in step 605, into a discount totaling memory, and then displays the amount of money of the discount totaling memory on the display unit of subscriber telephone set 1 (step 606). Naturally, the discount totaling memory has an initial value of 0 yen when first advertisement information is listened to. Then, the processing returns to step 601.

When the processing comes to step 601 for the second time, advertisement apparatus 6 to which subscriber telephone set 1 was connected for the first time is not used, but exchange 4 connects subscriber telephone set 1 and advertisement apparatus 7 to each other to put them into a communication state.

Then, steps 602 to 606 are executed similarly to those in the first cycle of operation, and then the processing returns to step 601. This sequence of operations is repeated. Consequently, the subscriber telephone set repeats connection to advertisement apparatus 6->advertisement apparatus 7->advertisement apparatus 6-> . . . . This repetition is continued until a stopping request is received in step 602. Another condition may be added that, if a user does not want to hear the same advertisement information a second time, the repetition is stopped also when connection to all advertisement apparatus set up for the exchange is completed.

When a stopping request is received in step 602, exchange 4 connects subscriber telephone set 1 and time announcement apparatus 8 to each other to establish a communication state, and subscriber telephone set 1 hears time information (step 607). Then, subscriber telephone set 1 continues to hear the time information until the communication charge between subscriber telephone set 1 and time announcement apparatus 8 becomes coincident with the amount of money of the discount totaling memory (step 608).

Then, if the communication charge between subscriber telephone set 1 and time announcement apparatus 8 becomes coincident with the amount of money of the discount totaling memory, then exchange 4 disconnects subscriber telephone set 1 and time announcement apparatus 8 from each other (step 609).

It is to be noted that, while, in the sixth embodiment, an operation from a subscriber telephone set is described, the present embodiment operates similarly in response to an operation from a public telephone set. Further, if not only time information but also a plurality of particular numbers are provided in a corresponding relationship to the time announcement apparatus, weather forecast apparatus and so forth, then suitable information can be selectively acquired by a user. This similarly applies when a destination of communication is dialed to communicate with another subscriber telephone set.

Further, while, in the sixth embodiment, it is described that a plurality of advertisement apparatus are involved, where a plurality of advertisement informations are sent out from a single advertisement apparatus, the system may be modified such that connection to the advertisement apparatus is continued until the telephone set performs an operation to deliver a stopping request while the advertisement informations are sent out successively and switchably and accounting is performed in a similar manner as in the present embodiment.

Embodiment 7

Figure 9:
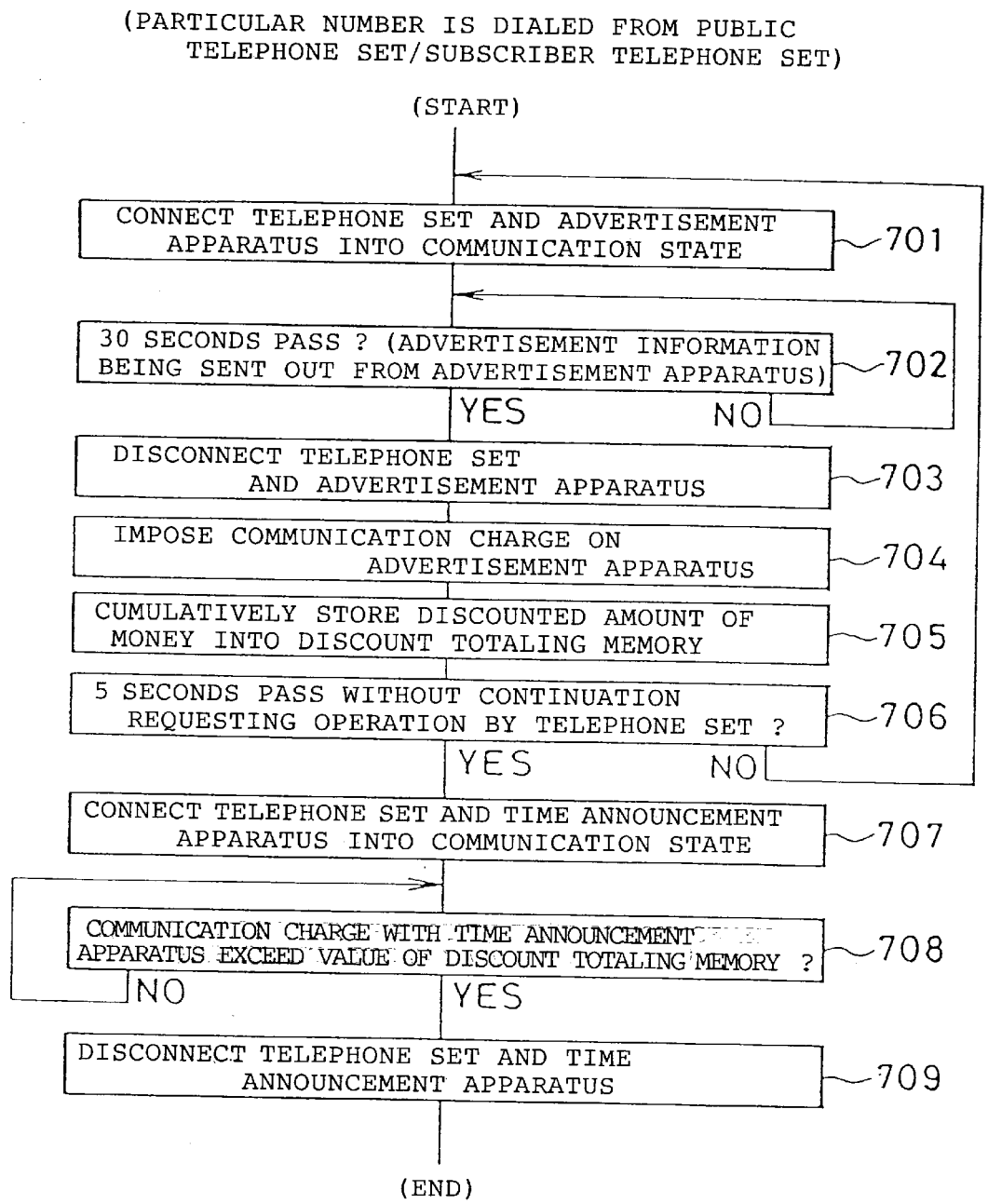
FIG. 9 is a flow chart illustrating operation of a seventh embodiment of the present invention.

Next, a seventh embodiment of the present invention is described in detail with reference to FIG. 2 and FIG. 9 which is a flow chart illustrating control of the exchange.

First, subscriber telephone set 1 in FIG. 2 is put into an off-hook state from a free state, and then a particular number determined in order to acquire advertisement information and time information is dialed. The particular number is determined and advertised in advance by a communication undertaker, and a user of subscriber telephone set 1 performs a dialing operation in order to receive advertisement information and time information.

Exchange 4 having received this particular number connects subscriber telephone set 1 and advertisement apparatus 6 to each other to establish a communication state. Then, advertisement information for 30 seconds is automatically sent out from advertisement apparatus 6 to subscriber telephone set 1 (step 701).

Then, exchange 4 supervises whether or not 30 seconds pass after the connection is established (step 702). Then, when subscriber telephone set 1 completes the acquisition of the advertisement information, that is, when 30 seconds pass, exchange 4 disconnects subscriber telephone set 1 and advertisement apparatus 6, which have been connected till then, from each other (step 703).

Thereafter, exchange 4 edits accounting information so that a communication charge for 30 seconds for which communication between subscriber telephone set 1 and advertisement apparatus 6 has been performed and a discount charge based on a result of the communication are imposed on the advertiser of the advertisement information transmitted from advertisement apparatus 6, and sends out the accounting information to accounting apparatus 10 (step 704).

Then, exchange 4 cumulatively stores the discounted amount of money imposed on the advertiser in step 704 into a discount totaling memory (step 705). Naturally, the discount totaling memory has an initial value of 0 yen when first advertisement information is heard.

Thereafter, exchange 4 supervises, for example, only for 5 seconds, whether or not a dialing operation for requesting continuation of advertisement information is performed by subscriber telephone set 1 (step 706). Then, when a request for continuation is received within 5 seconds, the processing returns to step 701.

When the processing comes to step 701 for the second time, advertisement apparatus 6 to which subscriber telephone set 1 was connected for the first time is not used, but exchange 4 connects subscriber telephone set 1 and advertisement apparatus 7 to each other to put them into a communication state. Then, steps 702 to 706 are executed similarly to those in the first cycle of operation, and then the processing returns to step 701. This sequence of operations is repeated. Consequently, the subscriber telephone set repeats connection to advertisement apparatus 6->advertisement apparatus 7->advertisement apparatus 6-> . . . . This repetition is continued each time a continuation request is received in step 706. However, another condition may be added that, if a user does not want to hear the same advertisement information a second time, the repetition is stopped also when connection to all advertisement apparatus set up for the exchange is completed.

Then, if a continuation request is not received in step 706, then exchange 4 connects subscriber telephone set 1 and time announcement apparatus 8 to each other to establish a communication state, and subscriber telephone set 1 hears time announcement information (step 707).

Subscriber telephone set 1 continues to hear the time announcement information until the communication charge between subscriber telephone set 1 and time announcement apparatus 8 becomes coincident with the amount of money of the discount totaling memory (step 708).

If the communication charge between subscriber telephone set 1 and time announcement apparatus 8 becomes coincident with the amount of money of the discount totaling memory, then exchange 4 disconnects subscriber telephone set 1 and time announcement apparatus 8 from each other (step 709).

It is to be noted that, while, in the present seventh embodiment, an operation from a subscriber telephone set is described, naturally the present embodiment operates similarly in response to an operation from a public telephone set. Further, if not only time information but also a plurality of particular numbers are provided in a corresponding relationship to the time announcement apparatus, weather forecast apparatus and so forth, then suitable information can be selectively acquired by a user. This similarly applies when a destination of communication is dialed to communicate with another subscriber telephone set.

Further, while, in the seventh embodiment, it is described that a plurality of advertisement apparatus are involved, where a plurality of advertisement informations are sent out from a single advertisement apparatus, the system may be modified such that connection to the advertisement apparatus is continued until the telephone set performs an operation to deliver a stopping request while the advertisement informations are sent out successively and switchably and accounting is performed in a similar manner as in the present embodiment.

Further, while, in the present seventh embodiment, it is supervised whether or not a continuation request is received within a fixed time, the system may be modified such that it is supervised whether or not a stopping request is received within a fixed time.

Embodiment 8

Figure 10:
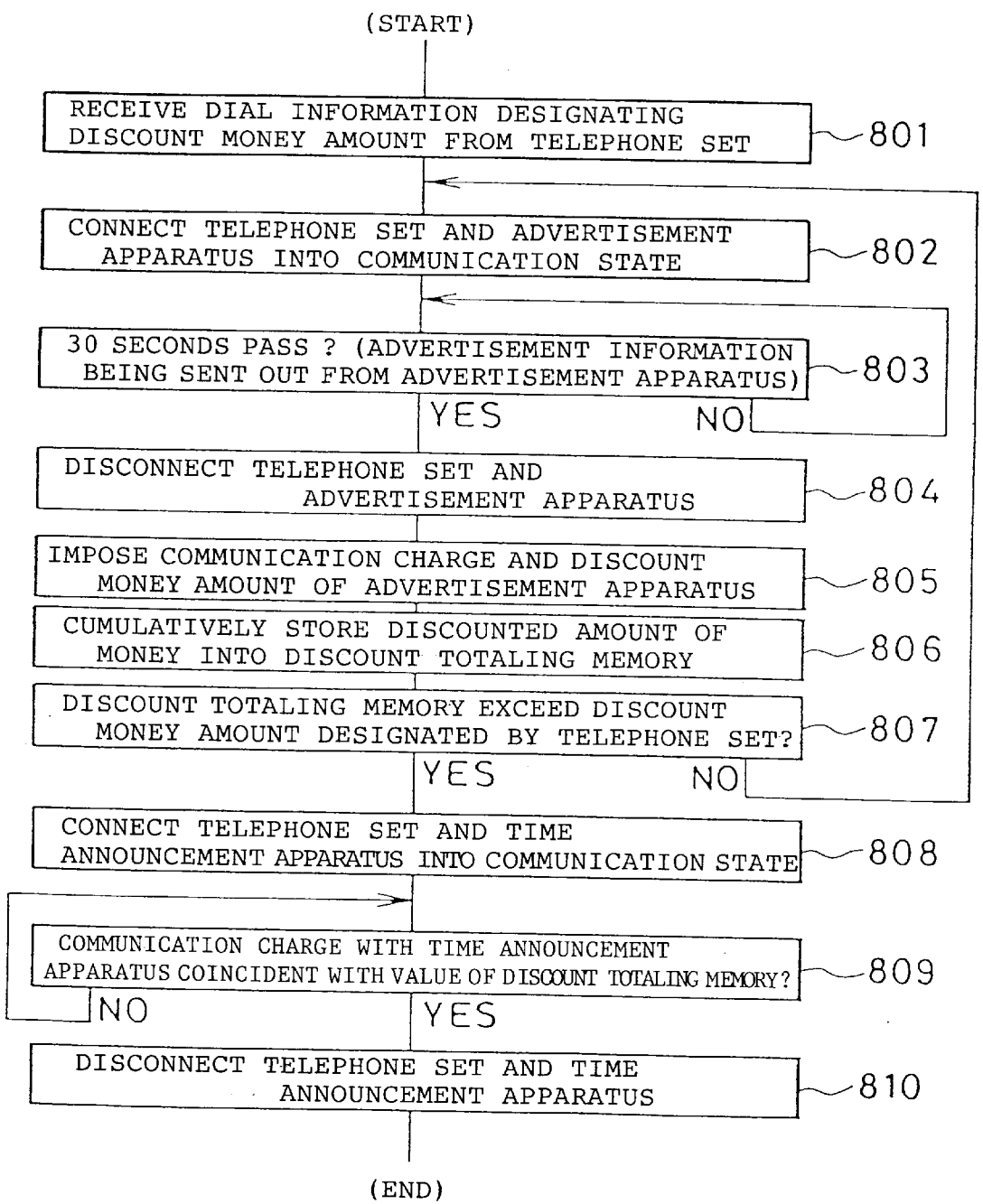
FIG. 10 is a flow chart illustrating operation of an eighth embodiment of the present invention.

Next, an eighth embodiment of the present invention is described in detail with reference to FIG. 2 and FIG. 10 which is a flow chart illustrating control of the exchange.

First, subscriber telephone set 1 in FIG. 2 is put into an off-hook state from a free state, and then a particular number determined in order to acquire advertisement information and time information is dialed. The particular number is determined and advertised in advance by a communication undertaker, and a user of subscriber telephone set 1 performs a dialing operation in order to receive advertisement information and time information.

Exchange 4 having received this particular number receives, from subscriber telephone set 1, dial information for designation of a desired discount amount of money (step 801).

Then, exchange 4 connects subscriber telephone set 1 and advertisement apparatus 6 to each other to establish a communication state. Then, advertisement information is automatically sent out from advertisement apparatus 6 to subscriber telephone set 1 (step 802).

Then, exchange 4 supervises whether or not 30 seconds pass after the connection is established (step 803). Then, when subscriber telephone set 1 completes the acquisition of the advertisement information, that is, when 30 seconds pass, exchange 4 disconnects subscriber telephone set 1 and advertisement apparatus 6, which have been connected till then, from each other (step 804).

Thereafter, exchange 4 edits accounting information so that a communication charge for 30 seconds for which communication between subscriber telephone set 1 and advertisement apparatus 6 has been performed and a discounted charge based on a result of the communication are imposed on the advertiser of the advertisement information transmitted from advertisement apparatus 6, and sends out the accounting information to accounting apparatus 10 (step 805).

Then, exchange 4 cumulatively stores the discounted amount of money, which has been imposed on the advertiser in step 805, into a discount totaling memory (step 806). Naturally, the discount totaling memory has an initial value of 0 yen when first advertisement information is listened to.

Then, it is discriminated whether or not the discount money amount which was desired in step 801 by subscriber telephone set 1 coincides with the discount money amount of the discount totaling money amount memory (step 807). If the discount money amount of the discount totaling money amount memory is lower than the desired discount money amount, the processing returns to step 802.

Then, when the processing comes to step 802 for the second time, advertisement apparatus 6 to which subscriber telephone set 1 was connected for the first time is not used, but exchange 4 connects subscriber telephone set 1 and advertisement apparatus 7 to each other to put them into a communication state. Then, steps 803 to 807 are executed similarly to those in the first cycle of operation, and then the processing returns to step 802. This sequence of operations is repeated. Consequently, the subscriber telephone set repeats connection to advertisement apparatus 6->advertisement apparatus 7->advertisement apparatus 6-> . . . . This repetition is continued each time a continuation request is received in step 807. However, another condition may be added that, if a user does not want to hear the same advertisement information second time, the repetition is stopped also when connection to all advertisement apparatus set up for the exchange is completed.

When the discount money amount of the discount totaling money amount memory exceeds the desired discount money amount in step 807, exchange 4 connects subscriber telephone set 1 and time announcement apparatus 8 to each other to establish a communication state, and subscriber telephone set 1 hears time announcement information (step 808).

Subscriber telephone set 1 continues to hear the time announcement information until the communication charge between subscriber telephone set 1 and time announcement apparatus 8 becomes coincident with the amount of money of the discount totaling memory (step 809).

If the communication charge between subscriber telephone set 1 and time announcement apparatus 8 becomes coincident with the amount of money of the discount totaling memory, then exchange 4 disconnects subscriber telephone set 1 and time announcement apparatus 8 from each other (step 810).

It is to be noted that, while, in the eighth embodiment, an operation from a subscriber telephone set is described, the present embodiment operates similarly in response to an operation from a public telephone set. Further, if not only time information but also a plurality of particular numbers are provided in a corresponding relationship to the time announcement apparatus, weather forecast apparatus and so forth, then suitable information can be selectively acquired by a user. This similarly applies when a destination of communication is dialed to communicate with another subscriber telephone set.

Further, while, in the present embodiment, it is described that a plurality of advertisement apparatus are involved, where a plurality of advertisement informations are sent out from a single advertisement apparatus, the system may be modified such that connection to the advertisement apparatus is continued until the discount money amount of the discount totaling money amount memory exceeds the desired discount money amount while the advertisement informations are sent out successively and switchably and accounting is performed in a similar manner as in the present embodiment.

Further, while, in the present embodiment, an example is described wherein a user designates a desired discount money amount, the system may be modified such that a user designates a number of times of provision of advertisement information or a period of provision of advertisement information.

As described above, according to the present invention, a discount money amount of a communication charge (amount of advertisement information to be received) can be selected by a user.

Embodiment 9

Next, a ninth embodiment of the present invention is described in detail with reference to the drawings.

Figure 11:
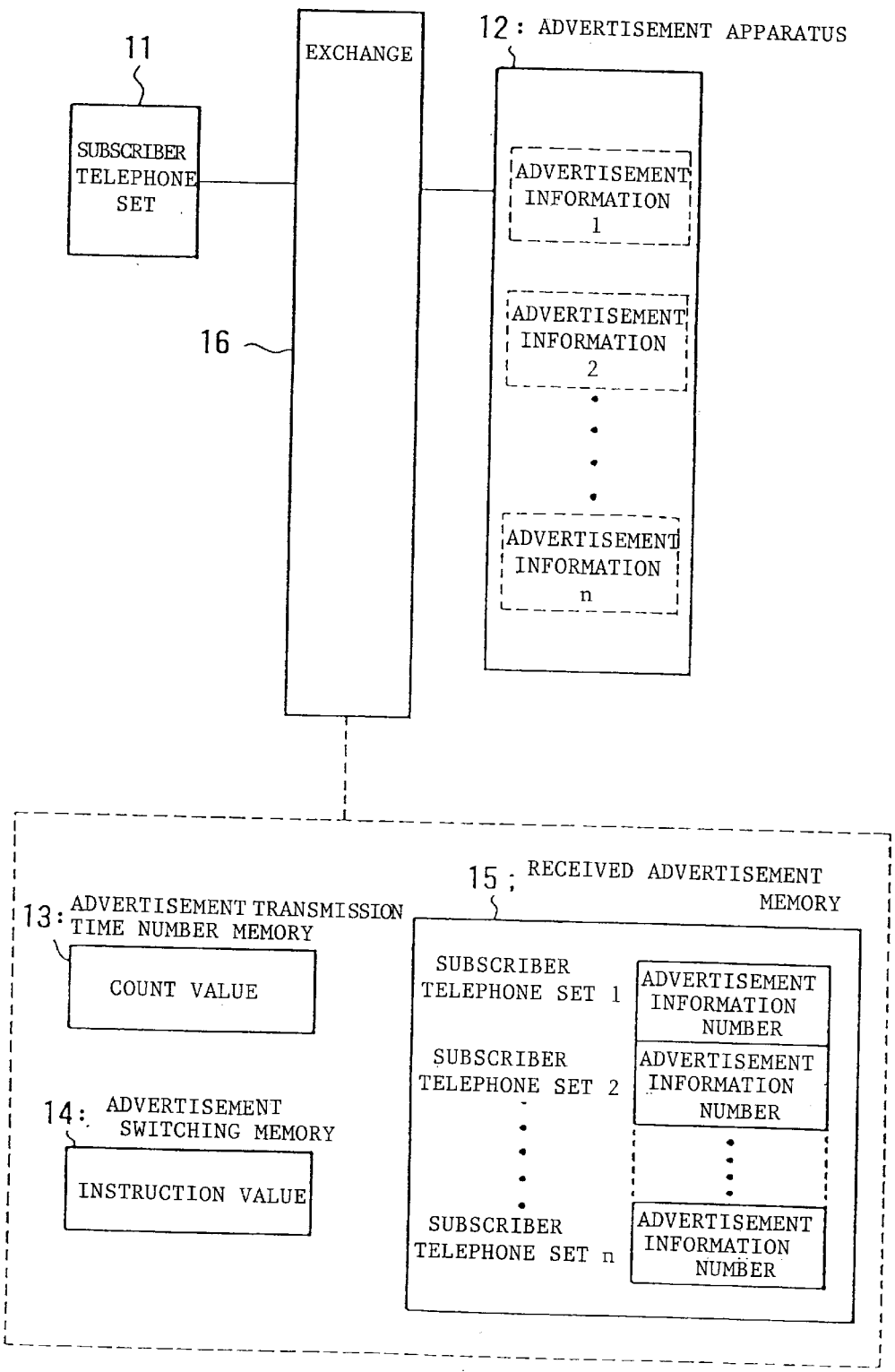
FIG. 11 is a block diagram showing a construction of a tenth embodiment of the present invention.

FIG. 11 is a block diagram showing a construction of the ninth embodiment of the present invention and shows a construction and connection of associated apparatus.

Referring to FIG. 11, in the ninth embodiment of the present invention, subscriber telephone set 11 set up in an ordinary home and advertisement apparatus 12 for sending out advertisement information by voice to a telephone set are accommodated in and connected to exchange 16 which controls connection of a public network. Advertisement apparatus 12 can send out a plurality of advertisement informations, and receives an instruction from exchange 16 and sends out one of advertisement informations 1 to n.

Advertisement transmission time number memory 13 provided in exchange 16 stores the number of times by which advertisement information is transmitted from advertisement apparatus 12. Meanwhile, a value determined in advance is stored in advertisement switching memory 14.

Figure 18:
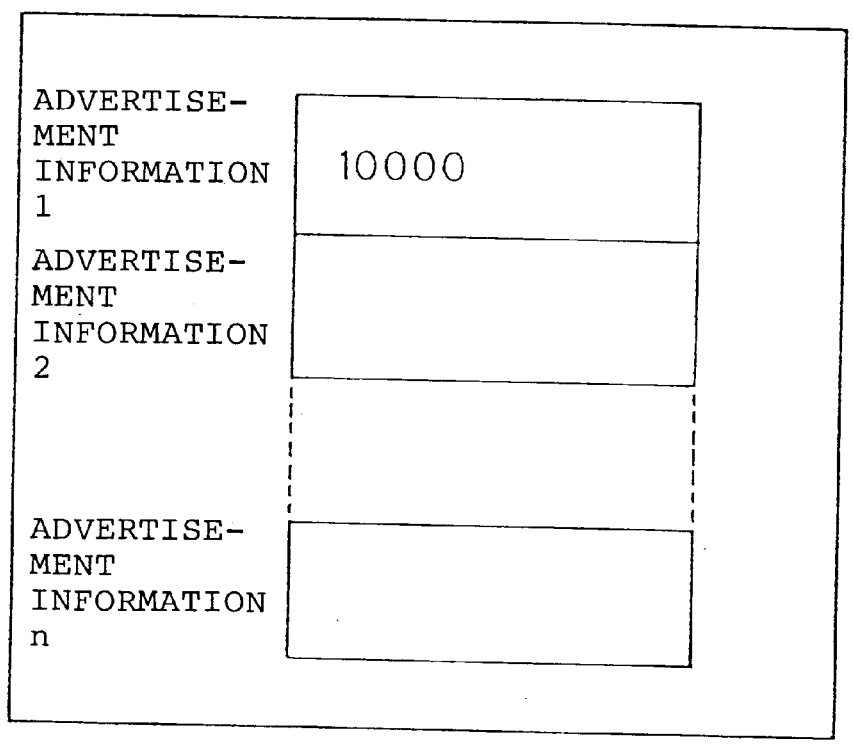
FIG. 18 is a view showing a memory construction of an embodiment of the present invention.
Figure 19:
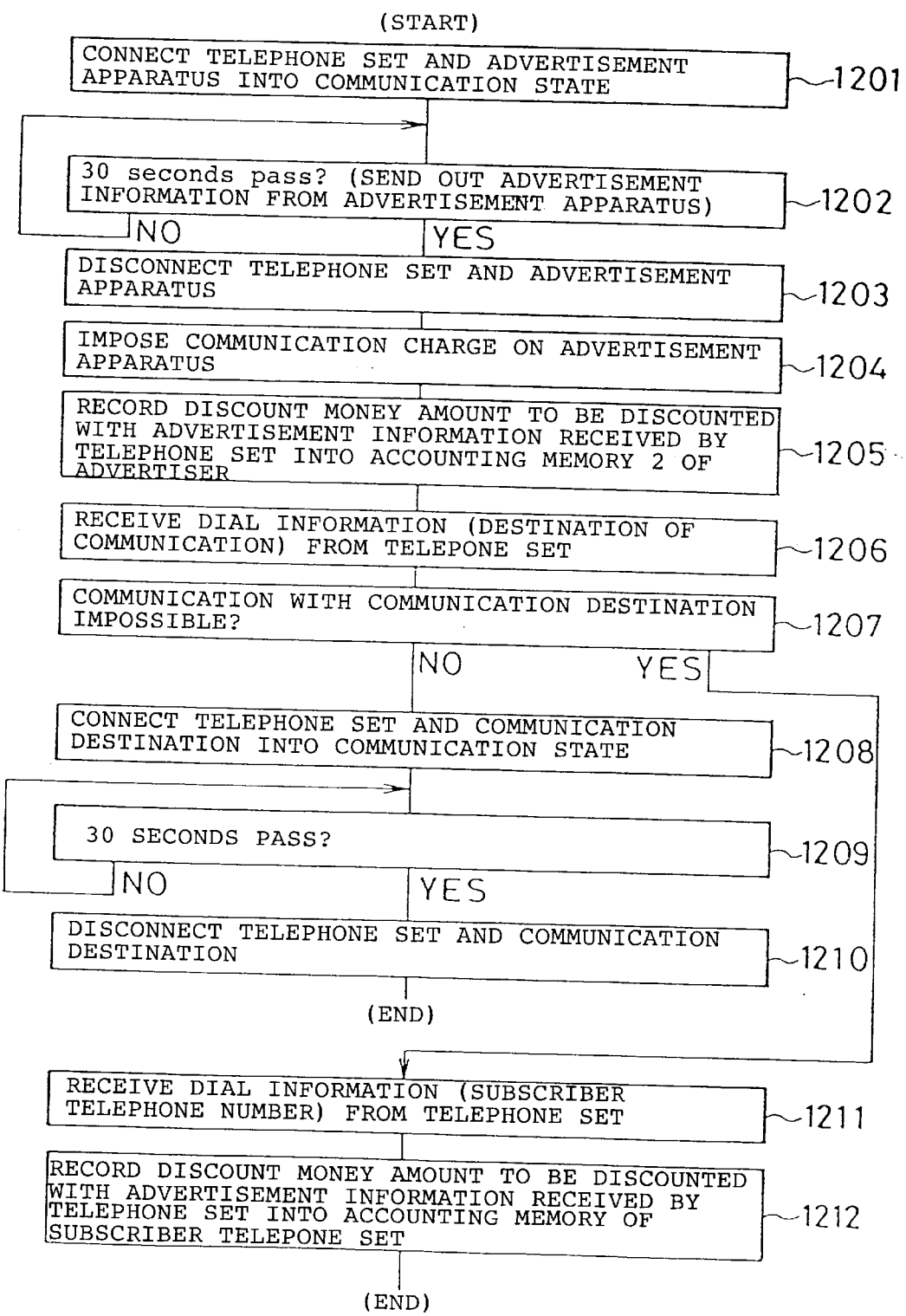
FIG. 19 is a flow chart illustrating operation of a twelfth embodiment of the present invention.

Further, FIG. 18 shows a sending out limit memory for advertisement information provided in exchange 16. The sending out limit memory stores, corresponding to advertisement informations 1 to n of advertisement apparatus 12, numbers of times by which sending out of the advertisement informations is permitted, and initial values for them are set in advance by a maintenance engineer for the exchange (for example, for advertisement information 1, a maximum number of times of 10,000).

Figure 12:
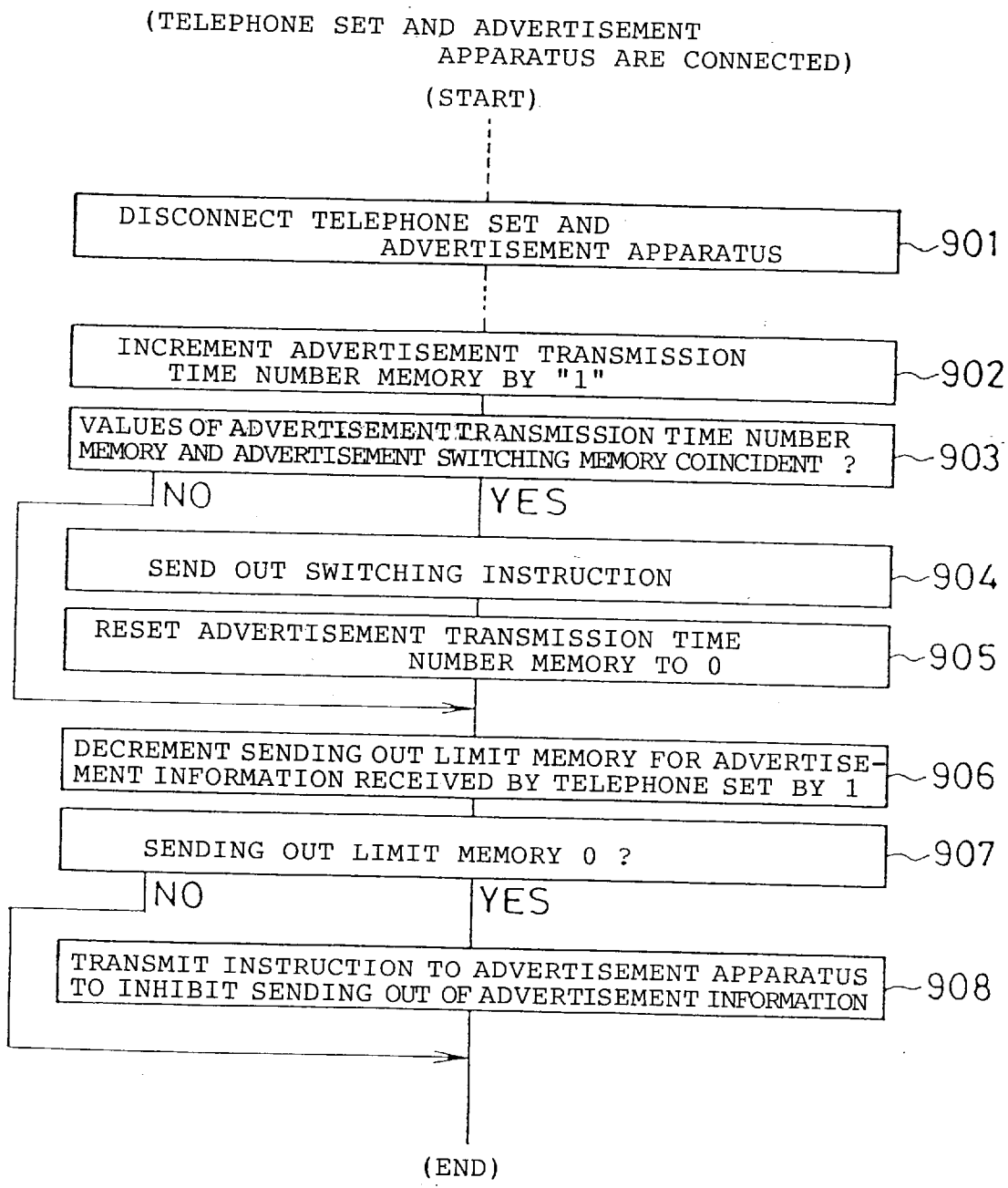
FIG. 12 is a flow chart illustrating operation of a ninth embodiment of the present invention.

Now, operation of the present ninth embodiment is described in detail with reference to FIG. 12 which is a flow chart illustrating control of the exchange. However, since operation after a telephone set and an advertisement apparatus are connected to each other until they are disconnected from each other and operation for accounting processing are described hereinabove in connection with the preceding embodiments, description of them is omitted here.

And, it is assumed that, for example, subscriber telephone set 11 shown in FIG. 11 has been put into an off-hook state from a free state and then advertisement information 1 has been heard already in response to an operation for hearing advertisement information. Here, subscriber telephone set 11 and advertisement apparatus 12 are disconnected from each other to stop sending out of advertisement information 1 (step 901).

Then, the count value of advertisement transmission time number memory 13 is incremented by "1" (step 902). Then, it is discriminated whether or not the count value coincides with the instruction value stored in advance in advertisement switching memory 14, and if they do not coincide with each other, then the processing advances to step 906 (step 903).

Thereafter, as far as coincidence of the two values is detected in step 903, when another subscriber telephone set (including subscriber telephone set 1) performs an operation for hearing advertisement information, advertisement information 1 is heard from advertisement apparatus 12, and steps 901 to 903 are executed, whereafter the processing advances to step 906.

If the two values exhibit coincidence in step 903, then exchange 16 sends out a switching instruction to advertisement apparatus 12 to switch a kind of advertisement information to be sent out (step 904). Advertisement apparatus 12 having received this switching instruction sends out advertisement information 2 when advertisement apparatus 12 is connected for the next time.

Thereafter, the count value of advertisement transmission time number memory 13 is reset to the initial value "0" (step 905). Thereafter, unless coincidence between two values is detected in step 903, when another subscriber telephone set (including also subscriber telephone set 1) performs an operation for hearing advertisement information, advertisement information 2 is heard from advertisement apparatus 12 and steps 901 to 903 are executed, whereafter the processing advances to step 906.

Thus, if the instruction value stored in advance in the advertisement switching memory is set, for example, to "1", then the kind of advertisement information can be switched every time.

Then, the value of the sending out limit memory shown in FIG. 18 which corresponds to the advertisement information is decremented by "1". In particular, when subscriber telephone set 11 hears advertisement information 1, the stored value corresponding to advertisement information 1 is re-written from "10000" to "9999" (step 906).

Then, it is discriminated whether or not this value is "0", and if the value is not "0", then the processing is ended without doing anything so that, when advertisement information is to be provided for the next time, advertisement information 1 remains in a state in which it can be provided (step 907).

On the other hand, if the sending out limit memory corresponding to advertisement information 1 is "0" in step 907, then exchange 16 transmits an instruction to advertisement apparatus 12 to inhibit sending out of advertisement information 1 (step 908). Consequently, after advertisement information 1 is sent out 10,000 times, advertisement information 1 is not sent out unless a maintenance engineer sets an initial value to the sending out limit memory again.

It is to be noted that, while, in the present embodiment, an example is described wherein a plurality of advertisement informations are sent out from a single advertisement apparatus, the system may be modified such that a plurality of advertisement apparatus each of which can send out only one kind of advertisement information are provided and, each time a predetermined transmission time number value is reached, one of the advertisement apparatus which is to be connected is determined. Further, while, in the present embodiment, a switching instruction is delivered from the exchange to an advertisement apparatus, the system may be modified such that a number designating a kind of advertisement information to be sent out is delivered to an advertisement apparatus. Further, while, in the present embodiment, switching of a kind or inhibition of transmission is effected in response to a transmission number of times, the system may be modified such that such switching or inhibition is effected in response to a transmission time amount or a discount money amount.

As described above, in the present embodiment, the probability that advertisement information of the same contents may be sent out to a telephone set can be minimized.

Embodiment 10

Next, a tenth embodiment of the present invention is described in detail with reference to the drawings.

FIG. 11 is a block diagram showing a construction of the tenth embodiment of the present invention and shows a construction and connection of associated apparatus.

Referring to FIG. 11, in the tenth embodiment of the present invention, subscriber telephone set 11 set up in an ordinary home and advertisement apparatus 12 for sending out advertisement information by voice to a telephone set are accommodated in and connected to exchange 16 which controls connection of a public network. Advertisement apparatus 12 can send out a plurality of advertisement informations, and receives an instruction from exchange 16 and sends out one of advertisement informations 1 to n.

Received advertisement memory 15 provided in exchange 16 has storage regions corresponding to all subscriber telephone sets (subscriber telephone sets 1 to n) for storing numbers of advertisement informations received by the subscriber telephone sets.

Figure 13:
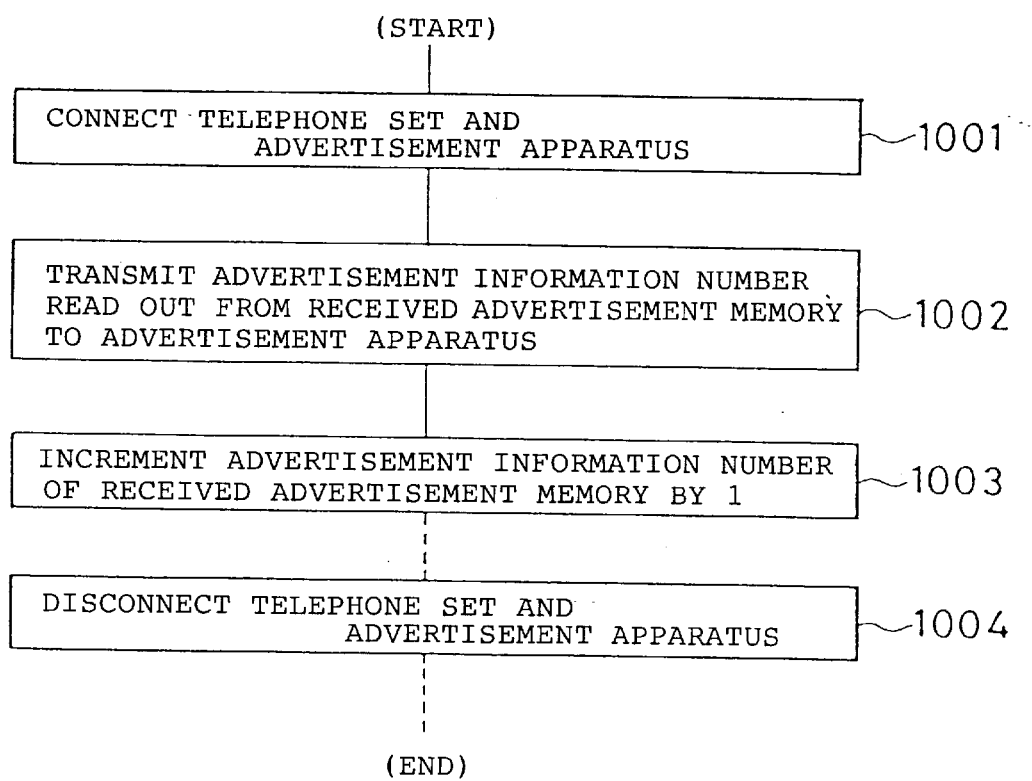
FIG. 13 is a flow chart illustrating operation of the tenth embodiment of the present invention.
Figure 17:
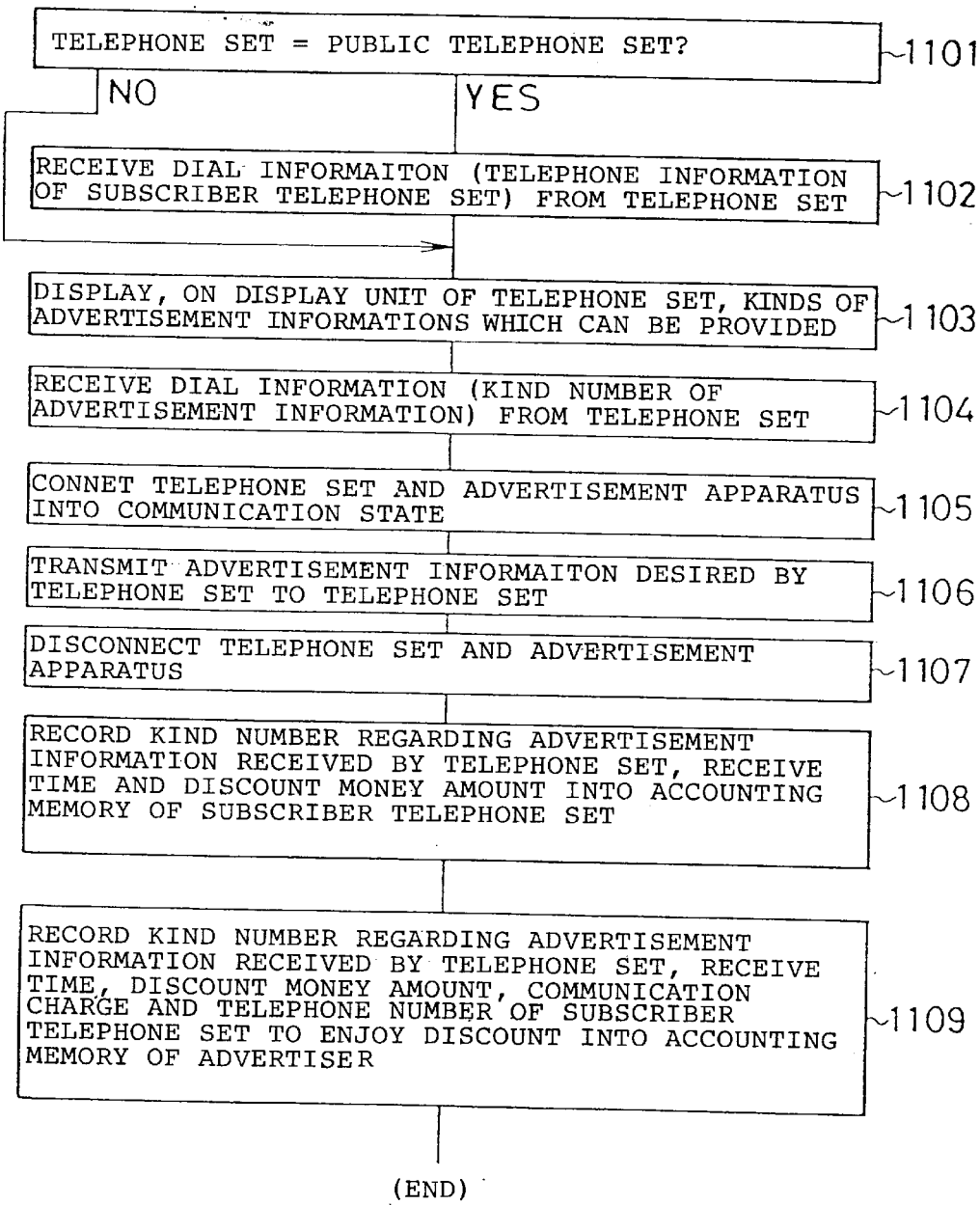
FIG. 17 is a flow chart illustrating operation of an eleventh embodiment of the present invention.

Now, operation of the present tenth embodiment is described in detail with reference to FIG. 13 which is a flow chart illustrating control of the exchange. However, since operation before a telephone set and an advertisement apparatus are connected to each other and operation for accounting processing are described hereinabove in connection with the preceding embodiments, description of them is omitted here.

The following description proceeds on the assumption that subscriber telephone set 11 shown in FIG. 11 has been put into an off-hook state from a free state and then an operation for hearing advertisement information has been performed.

First, exchange 16 connects subscriber telephone set 11 and advertisement apparatus 12 to each other (step 1001). Then, exchange 16 reads out the advertisement information number stored in a corresponding relationship to subscriber telephone set 11 from received advertisement memory 15 and transmits the advertisement information number to advertisement apparatus 12. If the advertisement information number is, for example, "1", then advertisement apparatus 12 receiving this transmits the contents of advertisement information 1 to subscriber telephone set 11 (step 1002).

Thereafter, exchange 16 increments the advertisement information number stored corresponding to subscriber telephone set 11 in received advertisement memory 15 by "1" to update it to "2" (step 1003). Then, after transmission of the advertisement information is completed, exchange 16 disconnects subscriber telephone set 11 and advertisement apparatus 12 from each other (step 1004).

It is a matter of course that, if the advertisement information number is "n" in step 1003, then this is subsequently returned to its initial value "1", that a timing for a fixed period of time is taken for confirmation of the completion of transmission of advertisement information in step 1004 or that exchange 16 receives a completion signal from advertisement apparatus 12.

As described above, in the present embodiment, when the same user hears advertisement information several times, it is prevented that the user hears advertisement information of the same contents successively several times.

Embodiment 11

Next, an eleventh embodiment of the present invention is described in detail with reference to FIGS. 2, 14, 15 and 16 and FIG. 17 which is a flow chart illustrating control of the exchange.

FIG. 14 illustrates a display image on a display unit (which corresponds to a display screen of a personal computer telephone set or a television telephone set) of subscriber telephone set 1 of FIG. 2, and FIG. 15 shows a storage region provided as accounting memory 1 in accounting apparatus 10 of FIG. 2 and illustrates an information construction of accounting information recorded corresponding to subscriber telephone sets. FIG. 16 shows a storage region provided as accounting memory 2 in accounting apparatus 10 of FIG. 2 and illustrates an information construction of accounting information recorded corresponding to advertisers which provide advertisement information.

First, subscriber telephone set 1 in FIG. 2 is put into an off-hook state from a free state, and then a particular number determined in order to acquire advertisement information is dialed. The particular number is determined and advertised in advance by a communication undertaker, and a user of subscriber telephone set 1 performs a dialing operation in order to receive advertisement information.

Exchange 4 having received this particular number identifies whether the dialing operation has been performed by a public telephone set or a subscriber telephone set, and if the dialing operation has been performed by a subscriber telephone set, then the processing advances to step 1103 (step 1101).

Then, exchange 4 displays, on the display unit of subscriber telephone set 1, kinds of advertisement informations which can be provided (step 1103). The display contents may include, for example, as shown in FIG. 14, the kind number and the field of advertisement information, target ages, the target sex, the advertisement time for which advertisement information is provided, the discount amount of money and the provided media indicating voice/still picture/moving pictures and so forth. When a user observing this display screen wants to receive an advertisement information regarding a travel in the form of moving pictures, the user dials "0002" of the kind number from subscriber telephone set 1 (step 1104).

Upon reception of the dial information, exchange 4 connects subscriber telephone set 1 and advertisement apparatus 7 (for travel information) to each other to establish a communication state (step 1105).

Then, an advertisement information regarding a travel for 30 seconds is sent out in the form of moving pictures from advertisement apparatus 7 to the display unit of subscriber telephone set 1 for 30 seconds (step 1106). Then, exchange 4 disconnects subscriber telephone set 1 and advertisement apparatus 7 from each other (step 1107).

Thereafter, exchange 4 records, into a region of subscriber telephone set 1 shown in FIG. 15 which corresponds to subscriber telephone set 1, the advertisement kind "0002", the receive time "2:30 a.m., March 1", and the discount money amount "30 yen" (step 1108).

Thereafter, exchange 4 records, into a region of accounting memory 2 shown in FIG. 16 which corresponds to advertiser 1 (the advertiser who provides advertisement information regarding travel), the telephone number (which is "03-XXXXXX" if subscriber telephone set 1 is set up in Tokyo) of the subscriber telephone set having received the advertisement information, the transmission time ("2:30 a.m., March 1") of the advertisement information, the discount money amount "30 yen" discounted for subscriber telephone set 1 and the transmission charge "10 yen" for 30 seconds for which communication has been performed between subscriber telephone set 1 and advertisement apparatus 7 (step 1109).

By tabulating the accounting information recorded in this manner, the communication undertaker can recognize a total value of discount money amounts for a fixed period for subscriber telephone set 1. Also, the communication undertaker can recognize discount charges and communication charges for the fixed period to be imposed on the advertiser.

Further, in order to know a total value of discount money amounts from subscriber telephone set 1, subscriber telephone set 1 is put into an off-hook state from a free state and a particular number determined in advance is dialed. Exchange 4 having received this particular number reads out an accounting information recorded in accounting apparatus 10 and displays it on the display unit of subscriber telephone set 1, for example, like

| "xxxxx (month), xxxx (year)/ | |
|---|---|
| basic rate | 1,000 yen/ |
| communication charge | 1,500 yen/ |
| discount charge | 2,600 yen/ |
| amount claimed | −100 yen" | as seen from FIG. 26.

The significances of the contents of the display are: the "basic rate" and the "communication charge" represent the amounts of money to be originally paid from subscriber telephone set 1 to the communication undertaker, and the "discount charge" represents the amount of money to be imposed on the advertiser as a result of the reception of the advertisement information by subscriber telephone set 1. And, the "amount claimed" is given as the difference between the "basic rate"+"communication charge" and the "discount charge". In this instance, the "amount claimed −100 yen" indicates that subscriber telephone set 1 can communicate free of charge for 100 yen in the future.

When the discount money amount is higher than the amount of money to be originally paid from subscriber telephone set 1 to the communication undertaker in this manner, various managing methods are applicable such that the discount money amount as the money amount difference is transferred to the next month or the discount is rendered invalid when the next month is entered. However, description of such methods is omitted since they can be applied merely by some modification to the present invention.

Next, operation of exchange 4 when it communicates with a public telephone set is described. Exchange 4 having received a particular number from public telephone set 3 discriminates whether or not the dialing operation has been performed by a public telephone set or a subscriber telephone set. In this instance, since the dialing operation has been performed by a public telephone set, the processing advances to step 1102 (step 1101).

Then, exchange 4 receives the telephone number "03-XXXXXX" of subscriber telephone set 1 dialed by public telephone set 3 (1102). Thereafter, exchange 4 operates in steps 1103 through 1109. In this instance, however, the subscriber telephone set which is to enjoy the discount upon recording in steps 1108 and 1109 is subscriber telephone set 1 (based on the telephone number dialed by the public telephone set in step 1102).

It is to be noted that, while, in the present embodiment, it is described that detailed accounting information is recorded into accounting memories 1 and 2, the discount money amount or the communication charge may be a simple accumulated value. Further, in the present embodiment, the "provided media" information to be displayed for guidance on the display unit is reference information for the user, and since this cannot be provided even if a dialing operation for requesting advertisement information in the form of moving pictures is performed, for example, from a telephone set which does not have a display unit for moving pictures, this can be notified to the user in advance. Further, where a telephone set is used which does not have a display unit for displaying a number of a kind of an advertisement information and so forth, a number of a kind may be dialed referring to a guide sheet or the like distributed by the communication undertaker.

Further, while, in the present embodiment, it is described that, in order to know a total value of discount money amounts from subscriber telephone set 1, a particular number determined in advance is dialed after subscriber telephone set 1 is put into an off-hook state from a free state, the total value may otherwise be displayed normally on the display unit of the subscriber telephone set. Further, for a terminal which does not have a display unit for displaying characters, it is a matter of course that information is notified by means of a voice/FAX signal to realize notification of the information.

As described above, according to the present invention, contents of advertisement information can be selected freely from a telephone set. Further, a terminal can recognize to which extent charge-free communication based on an accumulated discount charge is allowed in the future.

Embodiment 12

Next, a twelfth embodiment of the present invention is described in detail with reference to FIGS. 2, 14 and 15 and FIG. 19 which is a flow chart illustrating control of the exchange.

First, public telephone set 3 in FIG. 2 is put into an off-hook state from a free state, and then a particular number determined in order to acquire advertisement information and time information is dialed. The particular number is determined and advertised in advance by a communication undertaker, and a user of public telephone set 3 performs a dialing operation in order to receive advertisement information and time information.

Exchange 4 having received this particular number transmits, in steps 1201 to 1203, advertisement information for 30 seconds to public telephone set 3, produces accounting information so that a communication charge for the transmission and a discount money amount (amount of money to be imposed on the advertiser) to be discounted with advertisement information received by public telephone set 3 are recorded into accounting memory 2 shown in FIG. 16, and sends out the accounting information to accounting apparatus 10 (steps 1204 and 1205).

Then, exchange 4 receives the telephone number of a destination of communication dialed from public telephone set 3 (step 1206). Then, exchange 4 discriminates whether or not communication between the communication destination and the public telephone set is possible (step 1207). If the communication is possible, then the communication destination and public telephone set 3 communicate with each other for a fixed time (time corresponding to the amount of money to be discounted).

On the other hand, if it is discriminated in step 1207 that the communication is impossible, that is, when the communication destination is busy, when no response is received even after a fixed interval of time passes or when the dial information (telephone number of the communication destination) is a non-used number, the processing advances to step 1211. Then, exchange 4 receives a subscriber telephone number (for example, the telephone number of subscriber telephone set 1) from public telephone set 3 (step 1211).

Exchange 4 produces accounting information so that a discount money amount to be discounted with the advertisement information received by public telephone set 3 is recorded into a region of accounting memory 1 shown in FIG. 15 which corresponds to subscriber telephone set 1, and sends out the accounting information to accounting apparatus 10 (step 1212).

It is to be noted that, while, in the present embodiment, a subscriber telephone number is received after it is discriminated that communication with a communication destination is impossible, the subscriber telephone number may otherwise be received before connection to an advertisement apparatus.

In this embodiment, even if the communication is impossible because the communication destination is busy or from a like cause after advertisement information is heard from a public telephone set, the fact that the advertisement information has been heard does not come to naught.

Further, the system can cope with a case wherein the time when it is desired to receive advertisement information and the time when it is desired to communicate are different in time.

Furthermore, since the number of times by which advertisement information is sent out is recorded, such a situation that an advertiser pays an advertising expense to a communication undertaker while its advertisement information is not sent out at all can be prevented.

And, advertisement information can be sent out by a number of times corresponding to an amount of money charged to an advertiser.

Embodiment 13

Figure 20:
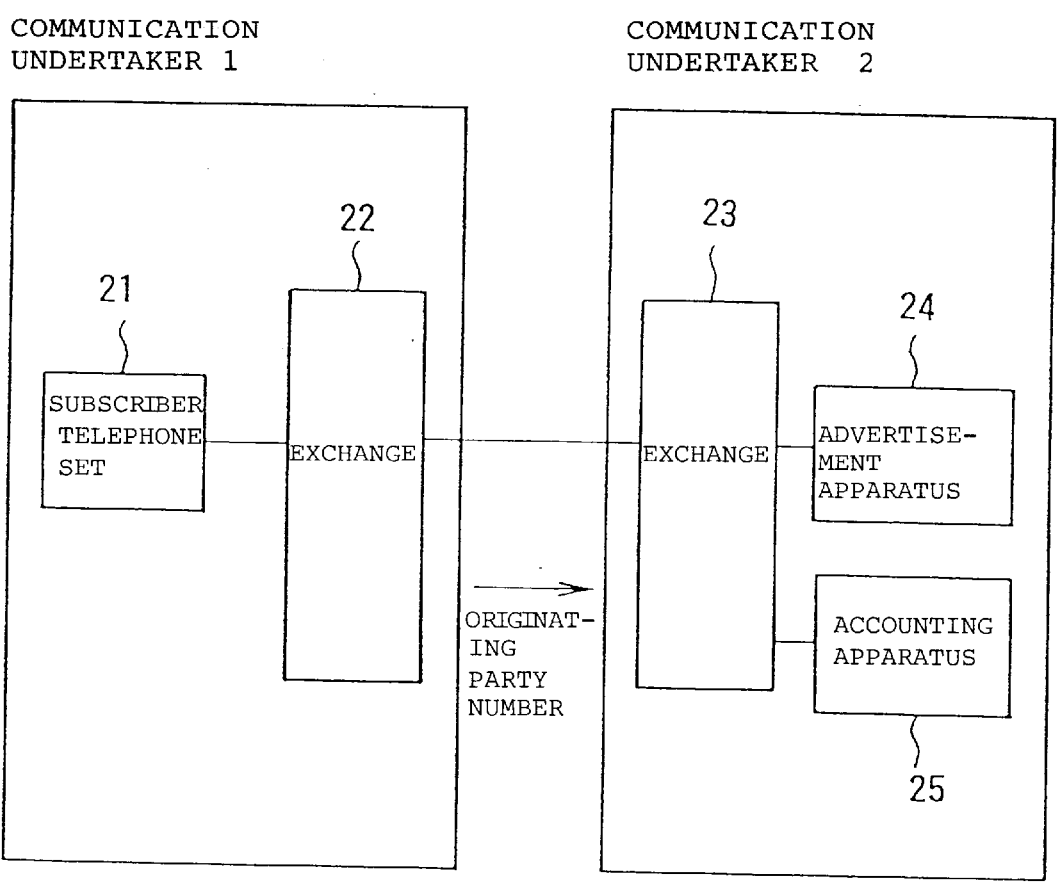
FIG. 20 is a block diagram showing a thirteenth embodiment of the present invention.

Next, a thirteenth embodiment of the present invention is described with reference to FIG. 20. FIG. 20 is a block diagram showing a construction of the present embodiment and shows a construction and connection of associated apparatus.

Referring to FIG. 20, in the thirteenth embodiment of the present invention, subscriber telephone set 21 is accommodated in and connected to exchange 22 of communication undertaker 1. Exchange 22 is connected to exchange 23 of communication undertaker 2.

Exchange 23 includes advertisement apparatus 24 and accounting apparatus 25, and subscriber telephone set 21 receives advertisement information from advertisement apparatus 24 via exchange 22 and exchange 23 when they are connected to each other.

Upon such connection, an originating party number (telephone number of subscriber telephone set 21) is sent out from exchange 22 to exchange 23. Exchange 23 stores a discount charge for subscriber telephone set 21 into accounting apparatus 25 in a corresponding relationship to the originating party number (telephone number of subscriber telephone set 21) so that the communication charge for subscriber telephone set 21 can be discounted.

With the present embodiment, an undertaker who provides only a communication network without providing communication terminals can discount a communication charge with advertisement information.

Embodiment 14

Figure 21:
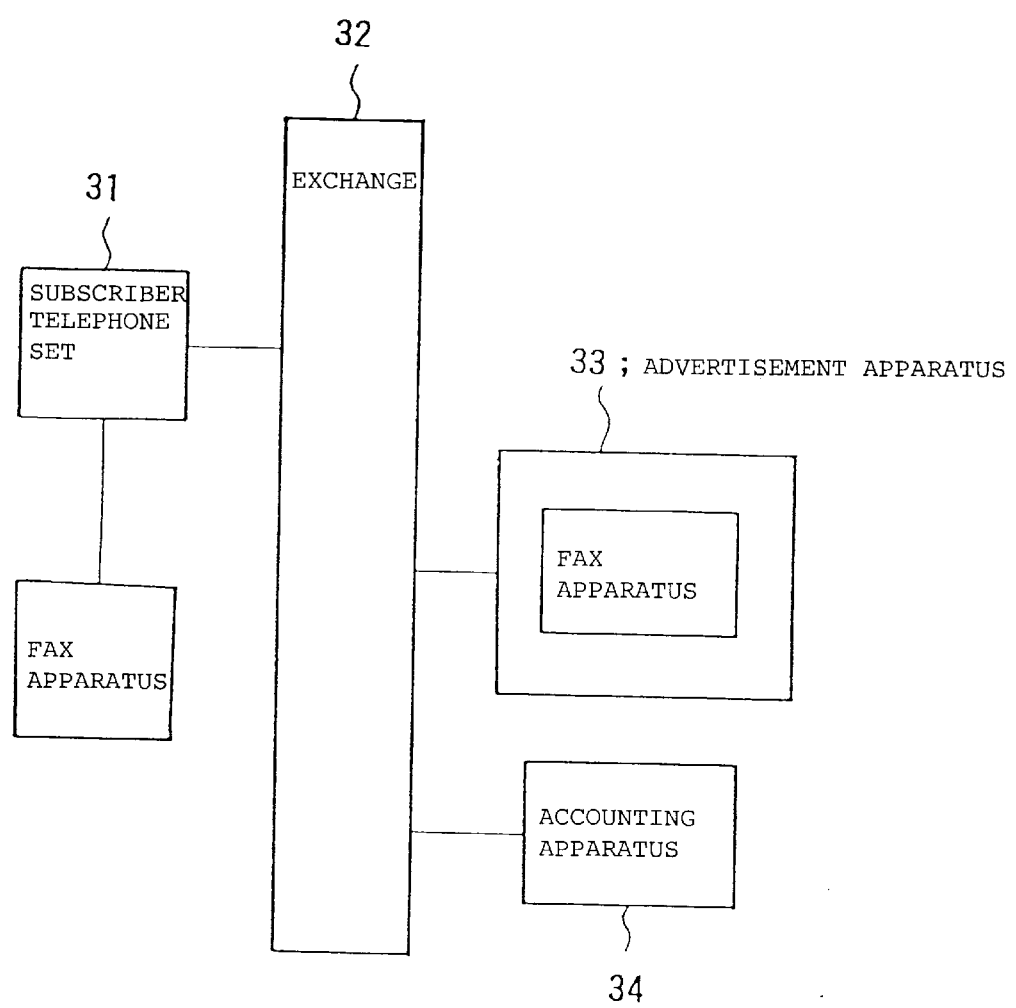
FIG. 21 is a block diagram showing a fourteenth embodiment of the present invention.
Figure 22:
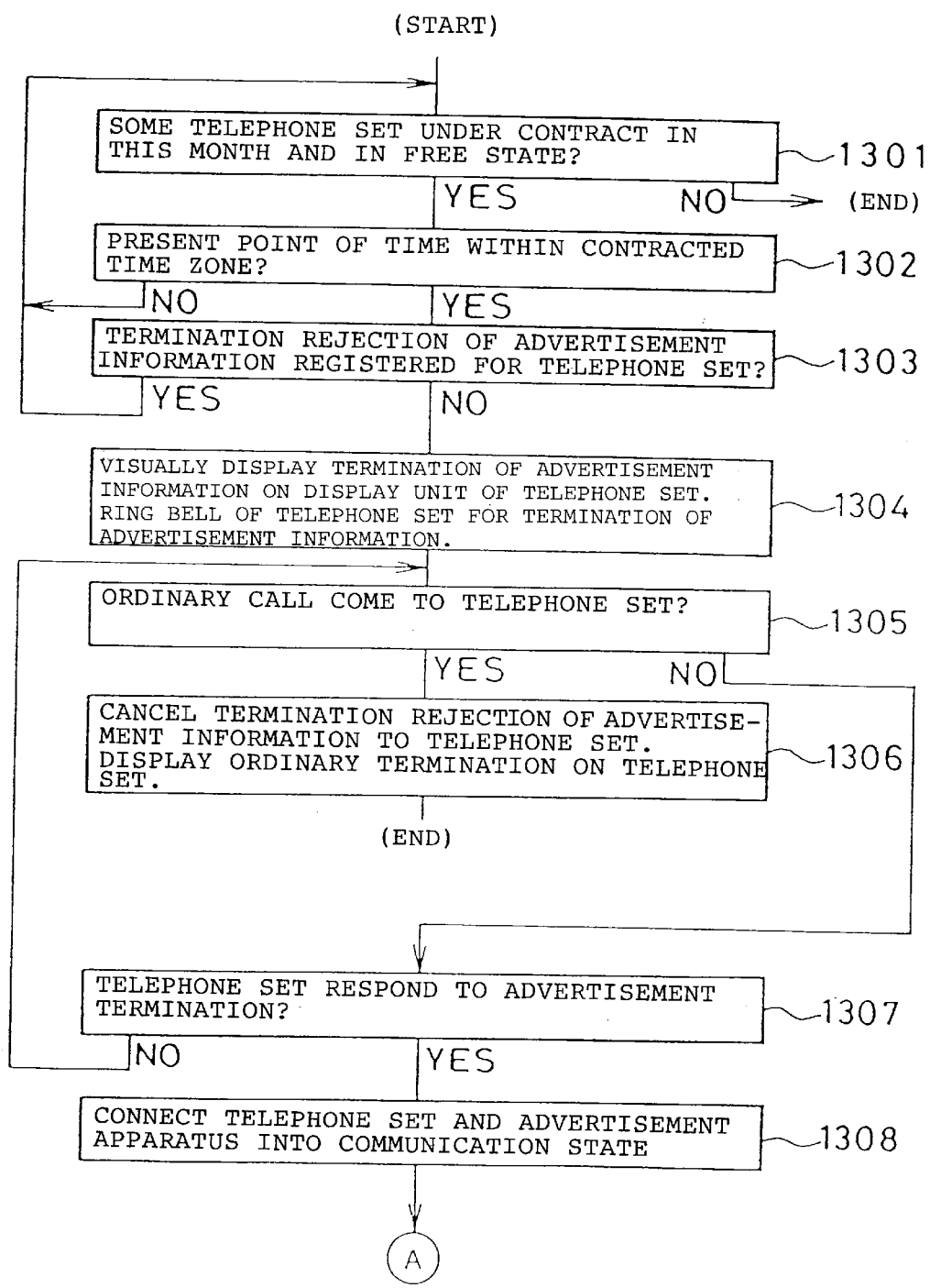
FIG. 22 is a flow chart illustrating operation of a fifteenth embodiment of the present invention.
Figure 23:
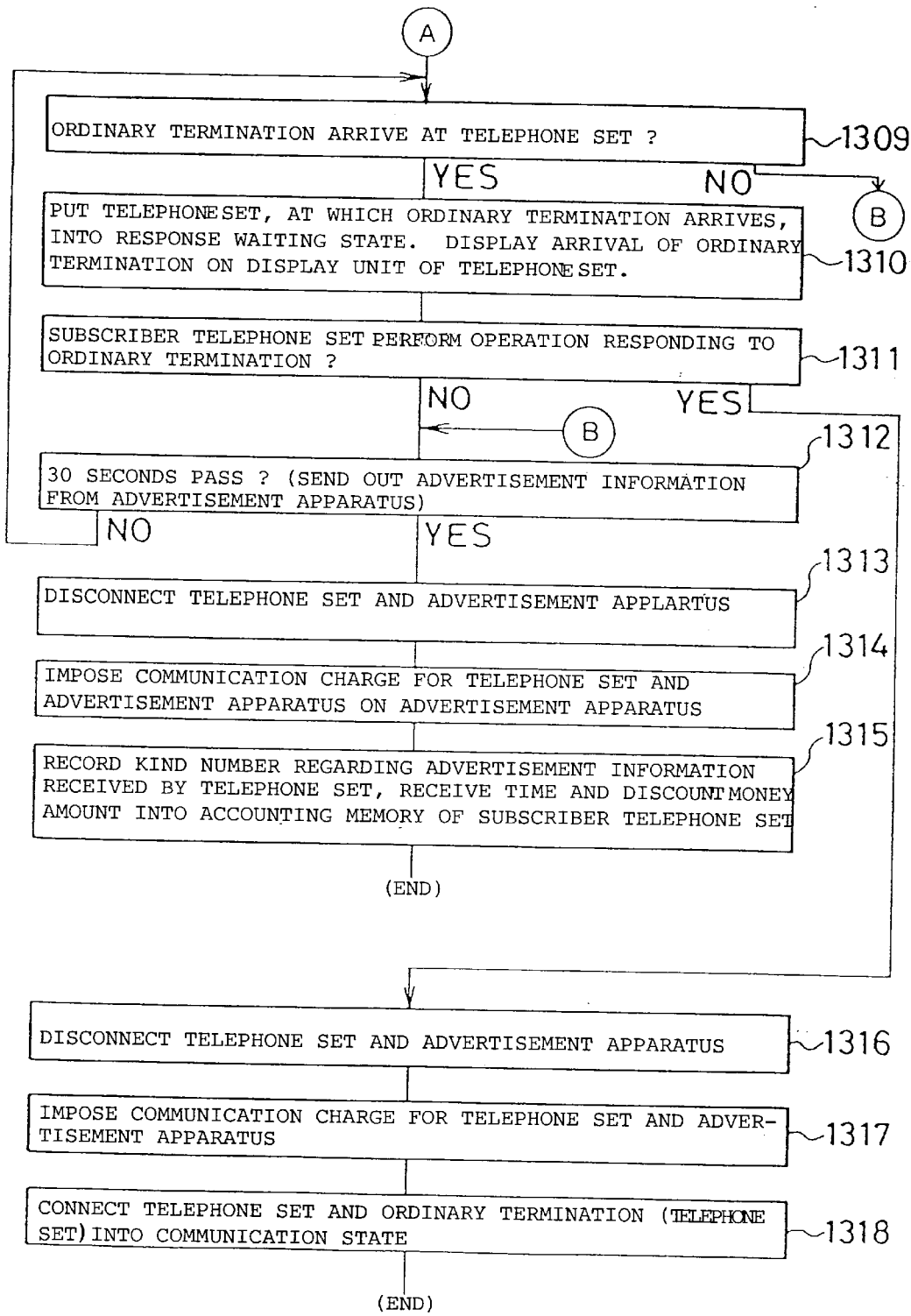
FIG. 23 is a flow chart illustrating operation of the fifteenth embodiment of the present invention.
Figure 24:
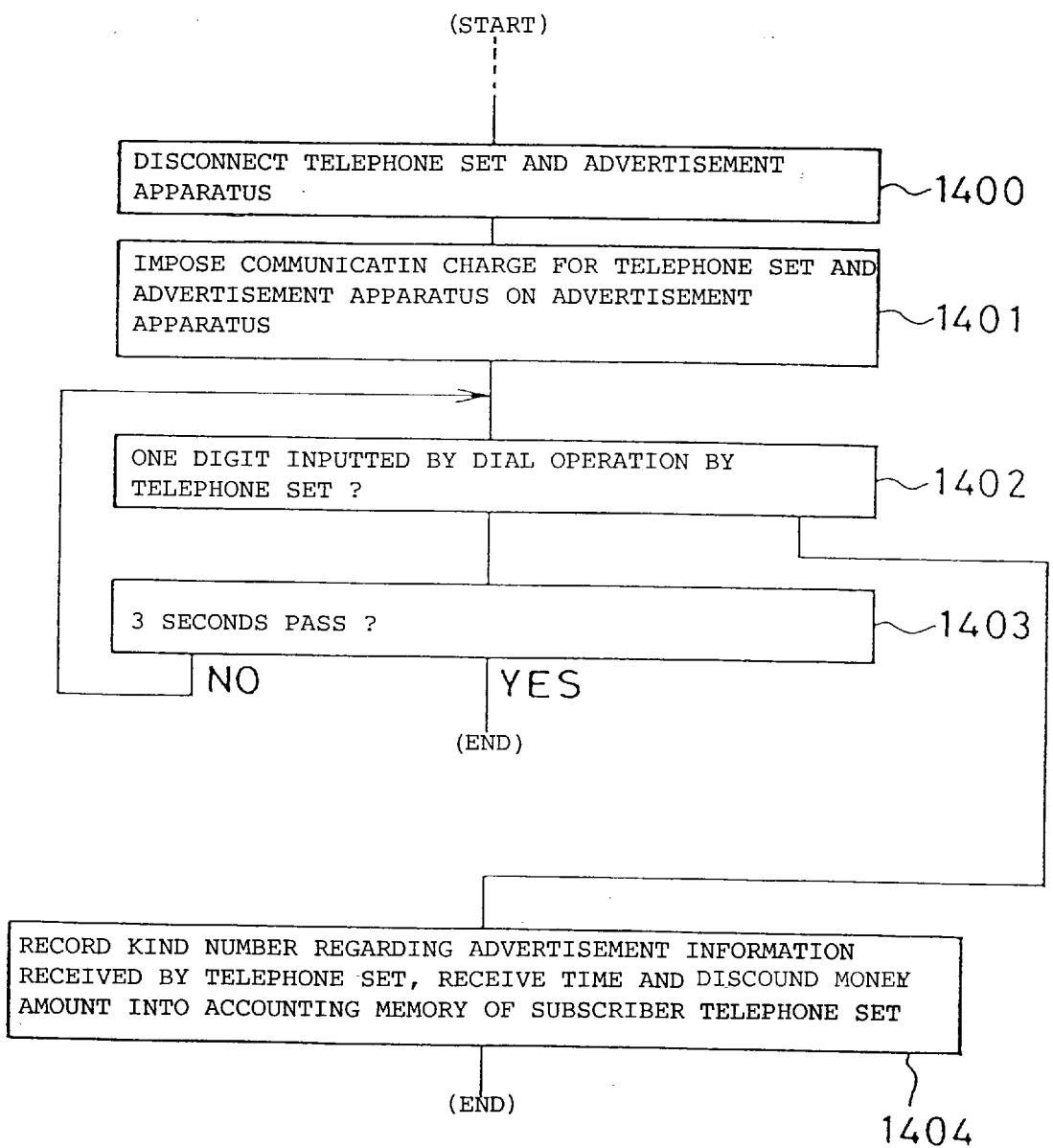
FIG. 24 is a flow chart illustrating operation of a sixteenth embodiment of the present invention.
Figure 25:
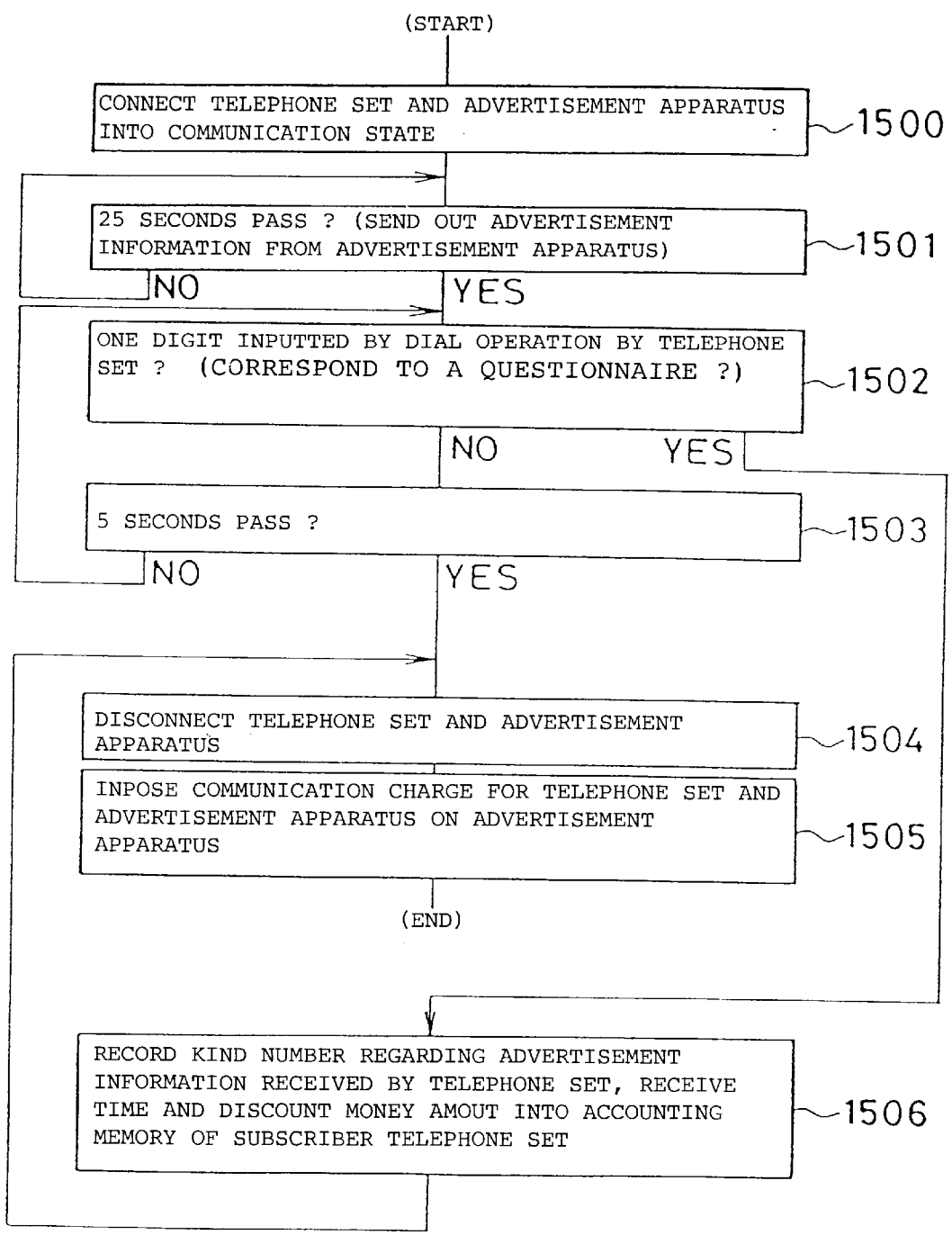
FIG. 25 is a flow chart illustrating operation of a seventeenth embodiment of the present invention.
Figure 27:
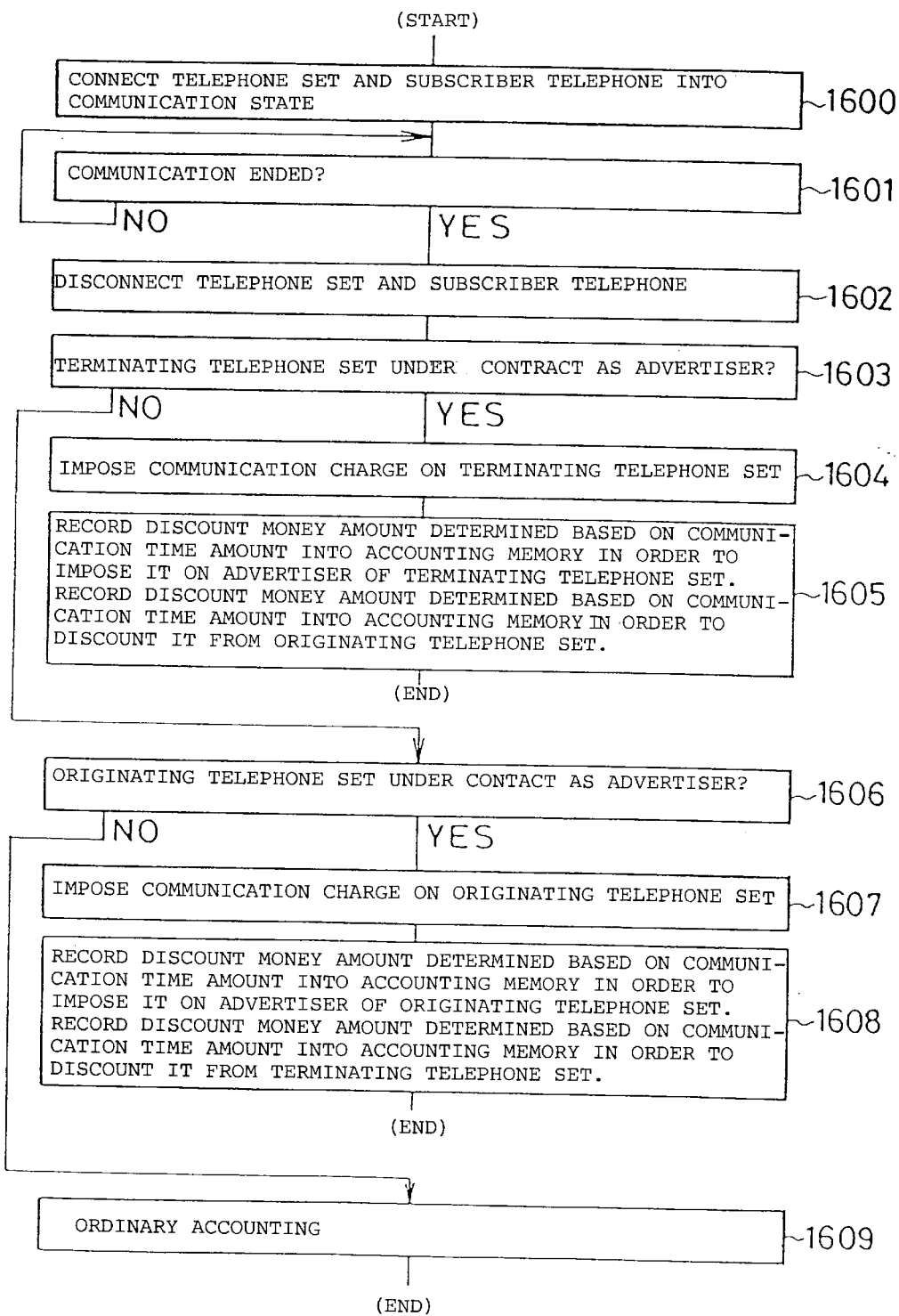
FIG. 27 is a flow chart illustrating operation of an eighteenth embodiment of the present invention.

Next, a fourteenth embodiment of the present invention is described with reference to FIG. 21. FIG. 21 is a block diagram showing a construction of the present embodiment and shows a construction and connection of associated apparatus.

Referring to FIG. 21, in the fourteenth embodiment of the present invention, subscriber telephone set 31 in which a FAX apparatus is built is accommodated in and connected to exchange 32. Further, advertisement apparatus 33 in which a FAX apparatus is built and accounting apparatus 34 are provided for exchange 32.

When subscriber telephone set 31 and advertisement apparatus 33 are connected to each other and subscriber telephone set 31 receives FAX data (advertisement information), a discount money amount for subscriber telephone set 31 based on an amount of time of reception is stored into accounting apparatus 34 in a corresponding relationship to the telephone number of subscriber telephone set 31 to effect discounting of the communication charge for subscriber telephone set 31.

With the present embodiment, even if advertisement information is provided by facsimile communication, the communication charge can be discounted.

Embodiment 15

Next, a fifteenth embodiment of the present invention is described in detail with reference to FIGS. 2, 15 and 16 and FIGS. 22 and 23 which are flow charts illustrating control executed periodically by the exchange.

Here, it is assumed that subscriber telephone set 1 in FIG. 2 has a contract for advertisement termination (consent of termination of advertisement information and a time zone within which advertisement information may be terminated) concluded with a communication undertaker and this information is registered as a data base in the exchange.

First, exchange 4 discriminates whether or not there is a subscriber telephone set which is under contract for advertisement termination and is in a free state, and ends its processing if there is no such subscriber telephone set (step 1301).

If subscriber telephone set 1 under contract is in a free state in step 1301, then exchange 4 discriminates whether or not the present point of time is within the contracted time zone, and if the present point of time is not within the time zone, then the processing returns to step 1301 in order to search for another contract telephone set (step 1302).

If the present point of time is within the time zone contracted by subscriber telephone set 1 in step 1302, then exchange 4 discriminates whether or not subscriber telephone set 1 has performed a dialing operation for temporarily rejecting advertisement termination, and if a rejection registration is detected, then the processing returns to step 1301 in order to search for another contract telephone set (step 1303).

If subscriber telephone set 1 has not performed registration of rejection in step 1303, then exchange 4 provides a visual display on the display unit of subscriber telephone set 1 indicating that advertisement information is terminated, and rings a bell of subscriber telephone set 1 in a tone different from that of bell sound upon ordinary termination (step 1304). Then, during calling while the bell of subscriber telephone set 1 is being rung, exchange 4 supervises whether or not an ordinary call comes (termination other than the advertisement termination) to subscriber telephone set 1 (step 1305).

If an ordinary call is terminated from subscriber telephone set 2 to subscriber telephone set 1 in step 1305, then exchange 4 cancels the visual display and the bell sound representative of calling of the advertisement termination to subscriber telephone set 1 and switchably effects calling by bell sound representing an ordinary termination (step 1306). Thereafter, if subscriber telephone set 1 effects a responding operation, then communication with subscriber telephone set 2 is permitted naturally.

On the other hand, if no ordinary termination is detected in step 1305, then exchange 4 supervises that subscriber telephone set 1 performs a responding operation to the advertisement termination (step 1307). Here, when no responding operation is performed, the advertisement termination may be canceled after a fixed interval of time. However, in the present embodiment, the supervision in steps 1307 and 1305 is repeated until a responding operation is performed.

Then, when a responding operation of subscriber telephone set 1 is received in step 1307, exchange 4 connects subscriber telephone set 1 and advertisement apparatus 6 to each other to establish a communication state and starts transmission of advertisement information from advertisement apparatus 6 to subscriber telephone set 1 (step 1308).

Then, exchange 4 supervises whether or not an ordinary termination arrives while subscriber telephone set 1 is hearing the advertisement information (step 1309).

If an ordinary termination arrives at subscriber telephone set 1 from subscriber telephone set 2 in step 1309, then exchange 4 puts subscriber telephone set 2 into a response waiting state and displays on the display unit of subscriber telephone set 1 that an ordinary termination is waiting (step 1310).

Exchange 4 supervises that subscriber telephone set 1 performs a particular operation (a hooking operation, an on-hook operation, a button operation or a like operation which may be determined by the system) determined in order to abandon hearing of advertisement information intermediately and respond to an ordinary termination (step 1311). When subscriber telephone set 1 performs the particular operation, exchange 4 disconnects subscriber telephone set 1 and advertisement apparatus 6 from each other (step 1316).

Then, exchange 4 produces accounting information for imposing a communication charge required for the communication between subscriber telephone set 1 and advertisement apparatus 6 on the advertiser of advertisement apparatus 6 and sends out the accounting information to accounting apparatus 10 so that the accounting information is stored into accounting memory 2 of FIG. 16 (step 1317). Thereafter, exchange 4 connects subscriber telephone set 1 and subscriber telephone set 2 to each other to establish a communication state so that the ordinary termination may have priority to the advertisement information (step 1318).

On the other hand, when subscriber telephone set 1 does not perform a responding operation in step 1311, exchange 4 supervises whether or not the transmission of the advertisement information has continued for more than a fixed time (30 seconds) (step 1312). Before the fixed time passes, exchange 4 successively supervises presence or absence of an ordinary termination and a responding operation to an ordinary termination.

Then, if lapse of the fixed time is detected in step 1312, then exchange 4 disconnects subscriber telephone set 1 and advertisement apparatus 6 from each other (step 1313). Then, exchange 4 produces accounting information for imposing a communication charge required for the communication between subscriber telephone set 1 and advertisement apparatus 6 on the advertiser of advertisement apparatus 6 and sends out the accounting information to accounting apparatus 10 (step 1314).

Thereafter, exchange 4 produces accounting information for recording a discount money amount with reception of the advertisement information by subscriber telephone set 1 into accounting memory 1 of FIG. 15 and sends out the accounting information to accounting apparatus 10 (step 1315). A communication charge claimed for subscriber telephone set 1 for each month may be adjusted with the thus recorded discount money amount.

When no ordinary termination arrives at subscriber telephone set 1 in step 1309, such sending out of advertisement information and sending out of accounting information as described above in connection with steps 1312 to 1315 are performed.

As described above, with the present embodiment, an undertaker can actively provide advertisement information to a user. Further, an advertisement termination can be rejected by an operation of a terminal. Furthermore, an advertisement termination does not disturb communication of an ordinary termination.

Embodiment 16

Next, a sixteenth embodiment of the present invention is described in detail with reference to FIGS. 2, 15 and 16 and FIG. 24 which is a flow chart illustrating control executed by the exchange.

It is assumed that subscriber telephone set 1 and advertisement apparatus 6 in FIG. 2 are connected to each other and hearing by subscriber telephone set 1 of advertisement information transmitted from advertisement apparatus 6 comes to an end. Thus, exchange 4 performs the following processing.

First, exchange 4 disconnects subscriber telephone set 1 and advertisement apparatus 6 from each other (step 1400). Then, exchange 4 produces accounting information for imposing a communication charge required for the communication between subscriber telephone set 1 and advertisement apparatus 6 on the advertiser of advertisement apparatus 6 and sends out the accounting information to accounting apparatus 10 so that the accounting information may be stored into accounting memory 2 of FIG. 16 (step 1401).

Then, exchange 4 supervises whether or not subscriber telephone set 1 dials an arbitrary one digit (step 1402). If subscriber telephone set 1 performs such dialing operation, then exchange 4 produces accounting information for recording a discount money amount with reception of the advertisement information by subscriber telephone set 1 into accounting memory 1 of FIG. 15 and sends out the accounting information to accounting apparatus 10 (step 1404).

However, if no dialing operation is performed in step 1402, then exchange 4 supervises such dialing operation for 3 seconds, and if 3 seconds pass without such dialing operation, then exchange 4 invalidates the discount which is based on the reception of the advertisement information by subscriber telephone set 1, thereby ending the processing (step 1403).

It is to be noted that, while, in the present invention, it is supervised that an arbitrary one digit is dialed from a terminal, a fixed digit determined in advance may be dialed instead, or a hooking operation determined in advance may otherwise be supervised. In short, it is only required that the communication undertaker determine a particular operation and make this known to users.

Furthermore, no one particular operation is determined for the entire system, but different particular operations may be determined for individual advertisement apparatus such that, after advertisement information is sent out or while advertisement information is being sent out, a particular operation is notified to a terminal by a voice/screen display or the like.

As described above, with the present embodiment, when a user ignores advertisement information provided or a like case, the user can be excluded from enjoyment of discounting.

Embodiment 17

Next, a seventeenth embodiment of the present invention is described in detail with reference to FIGS. 2, 15 and 16 and FIG. 25 which is a flow chart illustrating control executed by the exchange.

When an operation for receiving advertisement information is performed by subscriber telephone set 1 of FIG. 2, exchange 4 performs the following processing.

First, exchange 4 connects subscriber telephone set 1 and advertisement apparatus 6 to each other to establish a communication state (step 1500). Then, advertisement information is sent out from advertisement apparatus 6 to subscriber telephone set 1, and exchange 4 waits that, for example, 25 seconds pass (step 1501).

The advertisement information transmitted from advertisement apparatus 6 within 25 seconds include, by voice/screen display or the like, message information requesting that an answer to a questionnaire be returned in the form of a kind of dial digit and message information requesting that such dialing operation be performed within 5 seconds.

Then, exchange 4 supervises only for 5 seconds whether or not subscriber telephone set 1 performs a dialing operation for responding to a questionnaire (steps 1502 and 1503). If such dialing operation is not performed until after 5 seconds pass, then exchange 4 disconnects subscriber telephone set 1 and advertisement apparatus 6 from each other (step 1504).

Exchange 4 invalidates the discount which is based on the reception of the advertisement information by subscriber telephone set 1 and produces accounting information for imposing the communication charge required for the communication between subscriber telephone set 1 and advertisement apparatus 6 on the advertiser of advertisement apparatus 6. Then, exchange 4 outputs the accounting information to accounting apparatus 10 so that the accounting information may be stored into accounting memory 2 of FIG. 16 (step 1505). In this instance, exchange 4 determines that no answer to the questionnaire has been received, and invalidates the discount which is based on the reception of the advertisement information by subscriber telephone set 1, thereby ending the processing.

On the other hand, if subscriber telephone set 1 performs a dialing operation for responding to the questionnaire in step 1502, then exchange 4 produces accounting information for recording the discount money amount based on the reception of the advertisement information by subscriber telephone set 1 into accounting memory 1 of FIG. 15 and sends out the accounting information to accounting apparatus 10 (step 1506). Then, exchange 4 disconnects subscriber telephone set 1 and advertisement apparatus 6 from each other (step 1504). Exchange 4 validates the discount which is based on the reception of the advertisement information by subscriber telephone set 1 and produces accounting information for imposing the communication charge required for the communication between subscriber telephone set 1 and advertisement apparatus 6 on the advertiser of advertisement apparatus 6. Then, exchange 4 sends out the accounting information to accounting apparatus 10 so that the accounting information may be stored into accounting memory 2 of FIG. 15 (step 1505).

It is to be noted that, though not described in the present embodiment, it is a matter of course that dial information obtained as an answer to a questionnaire is recorded and this information is provided to the advertiser.

In this manner, with the present embodiment, when advertisement information provided is ignored by a user or a like case, the user cannot enjoy a discount. Further, it is also possible to collect answers to a questionnaire.

Embodiment 18

Next, an eighteenth embodiment of the present invention is described in detail with reference to FIGS. 2, 15 and 16 and FIG. 27 which is a flow chart illustrating control executed by the exchange.

It is to be noted that subscriber telephone set 11 shown in FIG. 2 is a terminal which has an advertisement apparatus built therein or added thereto, and if it is connected to and put into a communication state with another subscriber telephone set, then advertisement information is automatically transmitted from the advertisement apparatus.

It is assumed that subscriber telephone set 11 of FIG. 2 has a contract concluded with the communication undertaker so that subscriber telephone set 11 serves as an advertiser which provides advertisement information. And, when subscriber telephone set 1 is put into an off-hook state from a free state and then the telephone number of subscriber telephone set 11 is dialed in order to receive advertisement information, the following processing is performed.

First, exchange 4 calls subscriber telephone set 11, and if subscriber telephone set 11 automatically responds (when viewed from the exchange, an ordinary responding operation), then exchange 4 connects subscriber telephone set 1 and subscriber telephone set 11 to each other to establish a communication state (step 1600).

Consequently, transmission of advertisement information is automatically started from the advertisement apparatus built in subscriber telephone set 11 to subscriber telephone set 1. Then, exchange 4 supervises whether or not subscriber telephone set 1 is put into an on-hook state or whether or not subscriber telephone set 11 is automatically put into an on-hook state (when viewed from exchange 4, an ordinary on-hook operation), and if subscriber telephone set 1 or subscriber telephone set 11 is put into an on-hook state, then exchange 4 discriminates that the communication is ended (step 1601).

If it is discriminated in step 1601 that the communication is ended, then exchange 4 disconnects subscriber telephone set 1 and subscriber telephone set 11 from each other (step 1602).

Then, it is discriminated whether or not subscriber telephone set 11 which is the terminating telephone set is a subscriber telephone set which has a contract as an advertiser (step 1603). If the subscriber telephone set 11 has no contract as an advertiser, then exchange 4 discriminates whether or not subscriber telephone set 1 which is the originating telephone set has a contract as an advertiser (step 1606). Then, when subscriber telephone set 1 does not have such contract, that is, when both of the terminating telephone set and the originating telephone set are ordinary subscriber telephone sets, exchange 4 performs ordinary accounting processing, thereby ending the processing (step 1609).

However, in the present embodiment, since subscriber telephone set 11 which is the terminating telephone set has a contract as an advertiser, the processing advances from step 1603 to step 1604, and exchange 4 edits accounting information so that the communication charge required for the communication between subscriber telephone set 1 and subscriber telephone set 11 may be imposed on subscriber telephone set 11 which is the terminating telephone set, and outputs the accounting information to accounting apparatus 10 (step 1604).

Thereafter, exchange 4 edits accounting information so that a discount money amount determined in response to an amount of time required for the communication between subscriber telephone set 1 and subscriber telephone set 11 is recorded into accounting memory 2 shown in FIG. 16 with subscriber telephone set 11 recorded as an advertiser, and sends out the accounting information to accounting apparatus 10. Further, exchange 4 edits accounting information for discounting the discount money amount determined in response to the amount of time required for the communication between subscriber telephone set 1 and subscriber telephone set 11 from subscriber telephone set 1 and sends out the accounting information so that the accounting information may be recorded into a region of accounting memory 1 shown in FIG. 15 which corresponds to subscriber telephone set 1, thereby ending the processing (step 1605).

If subscriber telephone set 1 is called from subscriber telephone set 11 and advertisement information is provided from subscriber telephone set 11 to subscriber telephone set 1, then since the relationship between the originating telephone set and the terminating telephone set is reversed, it is discriminated in step 1606 that the originating telephone set has a contract as an advertiser. Then, exchange 4 edits accounting information so that the communication charge required for the communication between subscriber telephone set 1 and subscriber telephone set 11 may be imposed on subscriber telephone set 11 which is the terminating telephone set, and sends out the accounting information to accounting apparatus 10 (step 1607).

Thereafter, exchange 4 edits accounting information so that the discount money amount determined in response to the amount of time required for the communication between subscriber telephone set 1 and subscriber telephone set 11 is recorded into accounting memory 2 shown in FIG. 16 with subscriber telephone set 11 recorded as an advertiser, and sends out the accounting information to accounting apparatus 10. Further, exchange 4 edits accounting information for discounting the discount money amount determined in response to the amount of time required for the communication between subscriber telephone set 1 and subscriber telephone set 11 from subscriber telephone set 1 and sends out the accounting information to accounting apparatus 10 so that the accounting information may be recorded into a region of accounting memory 1 shown in FIG. 15 which corresponds to subscriber telephone set 1, thereby ending the processing (step 1608).

It is to be noted that the discount money amount determined in response to the amount of time required for the communication between subscriber telephone set 1 and subscriber telephone set 11 described in the present embodiment may be determined commonly by the system or may be determined for each of contracted subscriber telephone sets. Further, whereas, in the present embodiment, an end of communication is discriminated and the communication path is disconnected when a telephone set is put into an on-hook state, the exchange may otherwise supervise a fixed time so that the communication path may be disconnected compulsorily each time the fixed time passes.

As described above, with the present embodiment, even if a communication undertaker does not provide an advertisement apparatus, if an advertisement apparatus having a subscriber telephone set interface is provided by an advertiser, the present invention can be reduced to practice.
Embodiment 19

Figure 28:
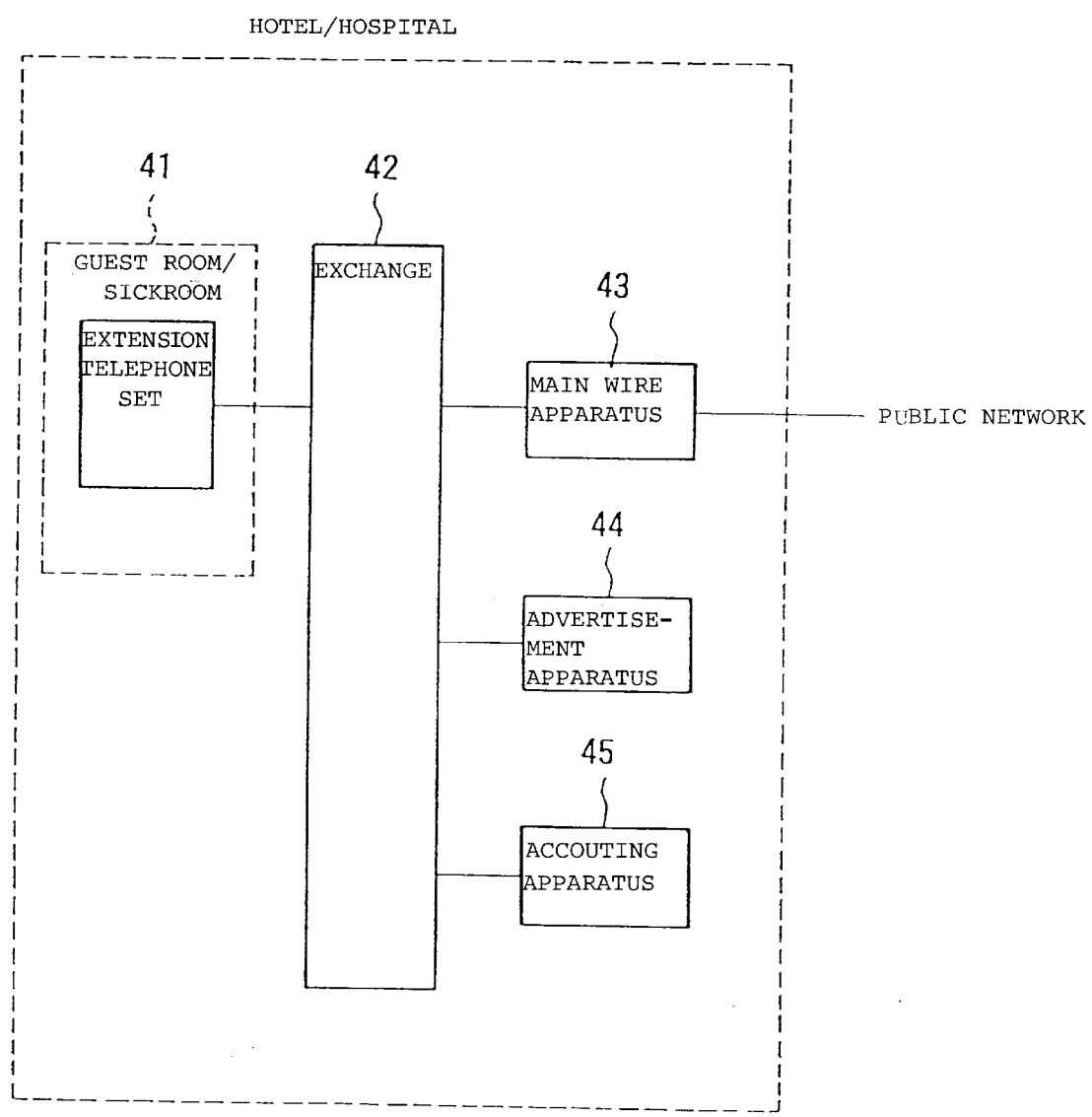
FIG. 28 is a block diagram showing a nineteenth embodiment of the present invention.

Next, a nineteenth embodiment of the present invention is described in detail with reference to the drawings. FIG. 28 is a block diagram showing a construction of the nineteenth embodiment of the present invention and shows a construction and connection of associated apparatus.

Referring to FIG. 28, in the nineteenth embodiment of the present invention, extension telephone set 41 set up in a guest room of a hotel/sickroom of a hospital and main wire apparatus 43 for transmission from extension telephone set 41 to a public network are accommodated in and connected to exchange 42 set up in a hotel/hospital. Further, advertisement apparatus 44 for sending out advertisement information to an extension telephone set and accounting apparatus 45 for recording a communication charge when transmission is performed from an extension telephone set to the public network are provided.

Figure 29:
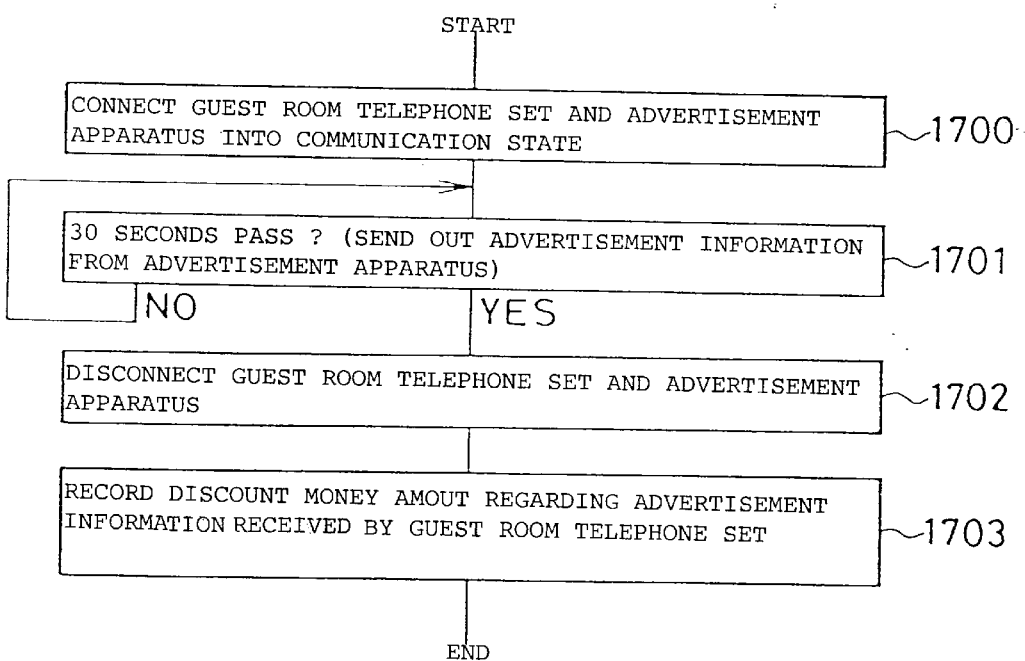
FIG. 29 is a flow chart illustrating operation of the nineteenth embodiment of the present invention.

Next, operation of the present embodiment where the exchange is provided in a hotel is described with reference to FIG. 29 which is a flow chart illustrating control of exchange 42.

First, extension telephone set 41 in FIG. 28 is put into an off-hook state from a free state, and then a predetermined particular number determined in order to acquire advertisement information is dialed. The particular number is determined and advertised in advance to a user of a guest room of the hotel, and a user of extension telephone set 41 performs a dialing operation in order to receive advertisement information.

Exchange 42 having received this particular number connects extension telephone set 41 and advertisement apparatus 44 to each other to establish a communication state (step 1700). Then, advertisement information for 30 seconds is automatically sent out from advertisement apparatus 44 to extension telephone set 41. Exchange 42 supervises whether or not 30 seconds pass after the connection is established (step 1701).

When extension telephone set 41 completes the reception of the advertisement information, that is, when 30 seconds pass, exchange 42 disconnects extension telephone set 41 and advertisement apparatus 44, which have been connected till then, from each other (step 1702). Here, an amount of money to be discounted as a result of reception of advertisement information by extension telephone set 41 from advertisement apparatus 44 is determined in advance, and exchange 42 produces accounting information for recording the discount money amount in a corresponding relationship to extension telephone set 41 and sends out the accounting information to accounting apparatus 45 (step 1703).

The discount money amount recorded in this manner and the communication charge (also this communication charge is recorded in the accounting apparatus) for the communication transmitted from extension telephone set 41 to the public network via main wire apparatus 43 are read out when the user checks out, and the communication charge during check-in is claimed to the user after the discount charge during check-in is subtracted from the same.

If the user does not originate a telephone call to the public network at all, then the hotel bill may be charged after the discount charge is subtracted from the same, or the accounting information (discount charge) may be used so that a communication charge may be discounted when the user checks in for the next time.

It is to be noted that, though not described in the present embodiment, a plurality of advertisers may be involved. In this instance, it is a matter of course as can be recognized from the other embodiments that information is recorded so that money amounts to be discounted from extension telephone sets can be charged to the plurality of advertisers.

Further, where an advertisement apparatus is provided in an exchange of a public network, also when an extension telephone set in a guest room is connected to the advertisement apparatus of the public network via an exchange of the hotel, the discount money amount may be subtracted upon checking out.

In this instance, the exchange of the hotel may analyze dial information from the extension telephone set to recognize that the destination is the advertisement apparatus and supervise a timing of a fixed time to determine the value of the discount money amount similarly to the exchange of the public network, or may receive a particular signal representative of a discount money amount from the exchange of the public network. This particular signal may be sent out using a PB signal or an ISDN control signal from the exchange of the public network.

As described above, according to the present embodiment, a discount based on advertisement information is possible also with a private exchange set up in a hotel, a hospital or the like.

As described so far, with the present invention, the following effects are exhibited.

The present invention exhibits an effect in that, even if a special public telephone set or subscriber telephone set is not set up, time information or the like which is usually provided with charge can be acquired free of charge using an ordinary public telephone set or a subscriber telephone set for an ordinary home, and consequently, as capital investment required to actually apply the present invention, only some modification to an exchange is required and the system can be realized with an expense lower than that required where a special terminal is set up. According to the present invention, for example, where 100,000 terminals are accommodated in an exchange, it is only required to modify the single exchange without setting up 100,000 special terminals.

Further, with the present invention, different from a special terminal which must receive advertisement information without fail, if an ordinary dialing operation is performed without performing a particular operation, then it is possible to talk without receiving advertisement information. In other words, the present invention provides the convenience that a user can select whether or not advertisement information should be received.

Furthermore, in the present invention, since an advertisement apparatus is set up in an exchange, there is an advantage that less expenses are required for maintenance for exchanging contents of advertisement information than where an advertisement apparatus is built in a terminal.

Besides, with the present invention, an undertaker who provides only a communication network regardless of terminals can discount a communication charge based on advertisement information. In addition, since subscriber telephone sets present already in ordinary homes are used, the system can be introduced readily.

Further, in the present invention, it is possible to combine a time announcement apparatus, a weather forecast apparatus or a like apparatus usually set up in a public network with an advertisement apparatus, and there is an advantage that the advertisement apparatus is simplified in structure. Furthermore, with the present invention, since time announcement information, weather information or like information is not placed in an advertisement apparatus, also the information management is not complicated at all. Besides, with the present invention, only if a single simple advertisement apparatus is used, such combination as advertisement information+time information or advertisement information+weather information becomes available.

Further, with the present invention, there is an effect that any destination of communication can be called from a subscriber telephone set or a public telephone set.

Further, with the present invention, a user can receive advertisement information from a public telephone set empty-handed without having a particular prepaid card, a coin, a telephone card or the like. Consequently, the system does not suffer from a problem caused by a forfeited prepaid card.

Furthermore, with the present invention, it can be selected by a dial operation of a user whether or not a communication charge is discounted totally or partially, and the system can satisfy a user who wants to select the charge-free option even if the communication is interrupted intermediately after, where the discount money amount is, for example, 50 yen, the user has communicated for 50 yen and another user who wants, after the user has communicated for 50 yen, to continue its communication even if the communication is charged for.

Further, with the present invention, there is an advantage that the discount amount (amount of advertisement information to be received) of a communication charge can be selected by a user. For example, where it is determined that, for example, a discount of 50 yen is enjoyed when advertisement information is received for 30 seconds, this is sufficient for short-haul/short-time communication. However, a user who wants long-haul/long-time communication may desire to receive advertisement information for three times the period, that is, for 90 seconds and enjoy a discount of 150 yen. Or, a user in a hurry may receive short advertisement information and talk enjoying a discount of a small amount, but another user who has much time may desire to receive advertisement information for a long time to increase an enjoyable discount. The present invention provides a system which satisfies such various demands.

Furthermore, with the present invention, since the probability that advertisement information of the same contents may be sent out to a telephone set can be suppressed to the minimum, when the same user hears advertisement information successively several times, the user does not hear advertisement information of the same contents several times. Consequently, there is an effect that the advertisement effect can be raised.

Besides, with the present invention, there is an advantage that contents of advertisement information can be selected freely from a telephone set. Consequently, such a useless situation that a person whose age is 10 receives advertisement information of a place for marriage ceremonies or a person whose age is 100 receives advertisement information of a sports car.

And, with the present invention, even if a call cannot be connected after advertisement information is heard from a public telephone set because the destination of communication is busy or the like, it does not become useless that advertisement information is heard.

Further, with the present invention, the system can cope with a case wherein the time when it is desired to receive advertisement information and the time when it is desired to talk do not coincide with each other in time (for example, after advertisement information is heard on January 1, the user can talk with a discounted charge on January 20).

Furthermore, with the present invention, since the number of times by which advertisement information is set out is recorded, occurrence of such a situation that an advertiser pays advertisement expenses to a communication undertaker although advertisement information of the advertiser is not sent out at all can be prevented. In particular, the system can be constructed so that an advertiser pays to an undertaker an amount of money which increases in proportion to the number of times by which advertisement information is sent out (for example, the amount of money for one month payable from the advertiser to the undertaker is determined as "fixed rate=50,000 yen"+"merit amount=number of advertisement information sending out times×100 yen", and the upper limit to the merit amount is set to 500,000 yen).

Or, the system can be so constructed that advertisement information can be sent out by a number of times which corresponds to an amount of money imposed on an advertiser (for example, where the amount of money for sending out of advertisement information once is determined to be 100 yen, if an advertiser wants sending out for 1,000 yen in the maximum, that is, by 10 times, then the advertisement information is sent out only by 10 times, and thereafter, sending out of the advertisement information is stopped).

And, with the present invention, an undertaker who provides only a communication network without providing communication terminals can discount a communication charge based on advertisement information.

Further, with the present invention, even if advertisement information is provided by facsimile communication, a communication charge can be discounted.

Furthermore, with the present invention, an undertaker can actively provide advertisement information to users. In particular, an undertaker can call a user, provide advertisement information to the user and discount the communication charge.

Besides, with the present invention, since termination of advertisement information can be rejected by an operation of a terminal, such a situation that a recording tape of a telephone answering machine is occupied only by advertisement information can be prevented.

And, with the present invention, termination of advertisement information does not disturb ordinary terminating communication at all.

Further, with the present invention, if a user ignores advertisement information provided such as when, for example, the user is reading a book or looking away, the user cannot enjoy the discount. Therefore, illegal use can be prevented.

Further, with the present invention, collection of answers to a questionnaire is possible.

Furthermore, with the present invention, there is an advantage that it can be recognized from a terminal how long charge-free communication based on an accumulated discount charge is available in the future.

Further, with the present invention, even if a communication undertaker does not provide an advertisement apparatus, the system can be realized if an advertiser sets up an advertisement apparatus having a subscriber telephone set interface, and exchanging of contents of advertisement information by the advertiser or like operation can be performed readily. Further, the capital investment of the communication undertaker can be reduced.

Furthermore, with the present invention, discounting based on advertisement information is possible with a private exchange which is set up in a hotel, a hospital or a like place.

What is claimed is:

1. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

providing a public telephone set which is capable of receiving the advertisement information even if said public telephone set does not have a telephone card or a coin inserted therein, where said terminal is a public telephone set;

connecting said terminal and said advertisement apparatus to each other for a fixed time; and connecting said terminal and said communication destination to each other for another fixed time to allow communication therebetween, if no telephone card or no coin is inserted in said public telephone set, the communication is interrupted, but if a telephone card or a coin is inserted in said public telephone set, the communication is continued, the communication charge for the continuing communication being paid from the telephone card or the coin.

2. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

transmitting a plurality of advertisement informations successively to said terminal;

stopping the transmission, when said terminal performs a requesting operation for stopping the transmission of advertisement information; and discounting a money amount corresponding to a total amount of the transmitted advertisement informations, and each time the transmission of one of the advertisement informations is completed, a total discounted money amount is displayed on a display unit of said terminal.

3. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

providing advertisement information to said terminal;

transmitting a different kind of advertisement information continuously, when said terminal performs, within a fixed time, an operation for requesting for continuous provision of advertisement information; and stopping the provision of advertisement information, if said terminal does not perform the requesting operation within the fixed time.

4. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

providing a received advertisement memory corresponding to said terminal for storing a kind of advertisement information received by said terminal; and providing advertisement information of a kind different from the stored kinds of the advertisement information, when advertisement information is to be provided to the same terminal for the next time.

5. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information; and displaying advertisement fields, target ages, target sexes, advertisement times, discount money amounts and provided media in a relationship to corresponding kind numbers, together with numbers of kinds of advertisement informations which can be provided, on a display screen of said terminal, where said terminal includes display means like a television telephone set/personal computer telephone set.

6. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

recording communication changes required when a subscriber telephone set for an ordinary home is used for a fixed period of time;

receiving advertisement information after an operation for designating a number of a subscriber telephone set is performed from a public telephone set;

recording for each subscriber telephone set designated from said public telephone set a money amount to be discounted based on reception of advertisement information by said public telephone set; and collecting periodically by a communication undertaker a money amount obtained by subtracting the money amount to be collected periodically.

7. An accounting method as claimed in claim 6, comprising the step of recording for each advertiser the number of the subscriber telephone set (originating party number) which receives advertisement information, the reception starting time/ending time of the advertisement information and the discounted money amount, simultaneously with the recording of the discount money amount for each subscriber telephone set, whereby the discounted money amount is periodically collected from the advertiser by a communication undertaker.

8. An accounting method as claimed in claim 6, comprising the steps of recording for each subscriber telephone set designated from said public telephone set the money amount to be discounted based on the reception of the advertisement information, after advertisement information is received, if communication between said public telephone set and a communication destination is impossible because the communication destination is busy/absent or the like, and collecting a communication charge obtained by subtracting the discount money amount from the communication charge to be collected periodically from said subscriber telephone set.

9. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information; and discounting a communication charge for originating party number information sent out from one of said exchanges in which said terminal is accommodated by one of said exchanges which provides the advertisement information, where advertisement information is provided via a plurality of communication undertakers.

10. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information; and discounting a communication charge for a facsimile terminal as a subscriber telephone set when said facsimile terminal receives advertisement information in the form of a facsimile signal from said advertisement apparatus.

11. An accounting method wherein, when a call is originated from or terminated at a terminal accommodated in a communication network to effect communication and a communication charge then is claimed to a user of said terminal, if said terminal receives advertisement information for commercial advertisement, the communication charge to be imposed on said terminal is discounted, comprising the steps of calling said terminal automatically from an exchange, and transmitting advertisement information from an advertisement apparatus provided for said exchange to said terminal, whereby the communication charge to be charged to said terminal is discounted.

12. An accounting method as claimed in claim 11, comprising the steps of stopping or suspending for a fixed time the automatic calling of said terminal from said exchange, when said terminal performs an operation for rejecting termination of advertisement information, and executing again the automatic calling, when said terminal performs another operation for canceling the rejection of termination of advertisement information or after a time for the rejection passes.

13. An accounting method as claimed in claim 11, comprising the steps of calling said terminal automatically from said exchange, and transmitting advertisement information to said terminal only within a fixed period or in a fixed time zone prescribed in a contract concluded between said terminal and a communication undertaker.

14. An accounting method as claimed in claim 11, comprising the step of sending out to said terminal a visible/audible display representing that the termination is automatic termination of advertisement information, while said terminal is automatically called or when said terminal does not respond as yet.

15. An accounting method as claimed in claim 11, further comprising the step of:

providing on said terminal a display for notifying an ordinary termination so that the ordinary termination may wait, when the ordinary termination arrives while said terminal is automatically called or when said terminal is receiving advertisement information.

16. An accounting method as claimed in claim 11, further comprising the step of:

performing by said terminal within a designated fixed time a predetermined operation determined in advance or another predetermined operation indicated in advertisement information provided to said terminal with a discount money amount, which is different from another discount money amount when the operation is not performed by said terminal.

17. An accounting method as claimed in claim 11, further comprising the step of:

displaying either an accumulated value of ordinary communication charges and an accumulated value of discount values, that is, a total value of discount values recorded for each subscriber telephone set, or a difference money amount between the accumulated values of the ordinary communication charges and the discount charges, that is, the accumulated value of the ordinary communication charges–accumulated value of the discount values, on a display unit, where said subscriber telephone set has said display unit.

18. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information;

imposing the communication charge on said advertising subscriber telephone set, where a subscriber telephone set (referred to as "advertising subscriber telephone set") having a special contract concluded with a communication undertaker serves as an advertisement apparatus, and when an ordinary subscriber telephone set and said advertising subscriber telephone set communicate with each other; and discounting a money amount corresponding to a time amount of the communication from the ordinary subscriber telephone set, after completion of the communication.

19. A communications system adapted to perform accounting of communications charges within a communication network, comprising:

a terminal to provide a communication outlet for a user;

an exchange capable of recognizing that a predetermined operation determined in advance has been performed by said terminal;

an advertisement apparatus coupled to said exchange to provide advertisement information for commercial advertisement to said terminal, wherein, when a call is originated from or terminated at said terminal accommodated in the communication network and a communication charge then is charged on said user of said terminal, if said terminal receives advertisement from said advertisement apparatus, said advertisement apparatus and said terminal are connected with each other and the communication charge to be imposed on said terminal is discounted, whereby a fixed money amount from within the communication charge to be charged to said terminal is imposed on an advertiser of the advertisement information; and a display adapted to said terminal for displaying the advertisement information.

20. A communications system adapted to perform accounting of communications charges within a communication network, comprising:

a terminal to provide a communication outlet for a user;

an exchange capable of calling said terminal automatically; and an advertisement apparatus coupled to said exchange, said advertisement apparatus adapted to transmit advertisement information for commercial advertisement to said terminal, wherein, when a call is originated from or terminated at said terminal accommodated in the communication network and a communication charge then is charged on said user of said terminal, if said terminal receives advertisement information, the communication charge to be imposed on said terminal is discounted.

21. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information; and providing on said terminal a display for notifying an ordinary termination so that the ordinary termination may wait, when the ordinary termination arrives while said terminal is automatically called or when said terminal is receiving advertisement information.

22. An accounting method wherein, when a call is originated from or terminated at a terminal accommodated in a communication network to effect communication and a communication charge then is claimed on a user of said terminal, if said terminal receives advertisement information for commercial advertisement, the communication charge to be imposed on said terminal is discounted, comprising the steps of:

recognizing by an exchange that a predetermined operation determined in advance has been performed by said terminal;

connecting an advertisement apparatus provided for said exchange and said terminal with each other;

providing advertisement information from said advertisement apparatus to said terminal, whereby a fixed money amount from within the communication charge to be charged to said terminal is imposed on an advertiser of the advertisement information; and displaying either an accumulated value of ordinary communication charges and an accumulated value of discount values, that is, a total value of discount values recorded for each subscriber telephone set, or a difference money amount between the accumulated values of the ordinary communication charges and the discount charges, that is, the accumulated value of the ordinary communication charges–accumulated value of the discount values, on a display unit, where a subscriber telephone set has said display unit.

* * * * *